United States Patent
Pabari

(10) Patent No.: US 8,799,431 B2
(45) Date of Patent: Aug. 5, 2014

(54) VIRTUAL SYSTEMS MANAGEMENT

(75) Inventor: Vipul Pabari, Carlsbad, CA (US)

(73) Assignee: Toutvirtual Inc., Carlsbad, CA (US)

( * ) Notice: Subject to any disclaimer, the term of this patent is extended or adjusted under 35 U.S.C. 154(b) by 139 days.

(21) Appl. No.: 11/503,090

(22) Filed: Aug. 10, 2006

(65) Prior Publication Data

US 2007/0043860 A1 Feb. 22, 2007

Related U.S. Application Data

(60) Provisional application No. 60/708,473, filed on Aug. 15, 2005.

(51) Int. Cl.
*G06F 15/173* (2006.01)
*G06F 15/177* (2006.01)
*G06F 15/16* (2006.01)

(52) U.S. Cl.
USPC ........... 709/223; 709/224; 709/226; 709/229; 709/220; 709/221

(58) Field of Classification Search
USPC .................. 709/223, 226, 224, 229, 220, 221
See application file for complete search history.

(56) References Cited

U.S. PATENT DOCUMENTS

| | | | |
|---|---|---|---|
| 7,463,648 B1 * | 12/2008 | Eppstein et al. ............. | 370/468 |
| 7,512,769 B1 * | 3/2009 | Lowell et al. ................ | 711/203 |
| 7,577,722 B1 * | 8/2009 | Khandekar et al. .......... | 709/220 |
| 2002/0166117 A1 * | 11/2002 | Abrams et al. ............... | 717/177 |
| 2003/0236882 A1 * | 12/2003 | Yan et al. ...................... | 709/225 |
| 2003/0236956 A1 * | 12/2003 | Grubbs et al. ................ | 711/162 |
| 2005/0044301 A1 * | 2/2005 | Vasilevsky et al. ............ | 711/1 |
| 2005/0138165 A1 * | 6/2005 | Tang et al. .................... | 709/224 |
| 2005/0155033 A1 * | 7/2005 | Luoffo et al. ................. | 718/104 |
| 2006/0069761 A1 * | 3/2006 | Singh et al. .................. | 709/222 |
| 2006/0149842 A1 * | 7/2006 | Dawson et al. .............. | 709/226 |
| 2006/0184937 A1 * | 8/2006 | Abels et al. ................... | 718/1 |
| 2006/0294238 A1 * | 12/2006 | Naik et al. .................... | 709/226 |
| 2007/0067435 A1 * | 3/2007 | Landis et al. ................. | 709/224 |
| 2008/0086731 A1 * | 4/2008 | Trossman et al. ............ | 718/100 |

* cited by examiner

*Primary Examiner* — Noel Beharry
*Assistant Examiner* — Abdelnabi Musa
(74) *Attorney, Agent, or Firm* — DLA Piper LLP (US)

(57) ABSTRACT

Automatic configuration management of a network is provided by determining an inventory of resources at a virtualization layer of a node of the network, assigning prioritization to members of a set of network configuration elements, allocating virtual resources among the set of network configuration elements, establishing a network configuration. The configuration is managed by determining real time performance metrics for the configuration, producing a reallocation of the virtual resources based on the performance metrics that are estimated to change the established configuration, change the performance metrics, and initiating the reallocation of the virtual resources. This Abstract is provided for the sole purpose of complying with the Abstract requirement that allows a reader to quickly ascertain the subject matter of the disclosure contained herein. This Abstract is submitted with the understanding that it will not be used to interpret or to limit the scope or the meaning of the claims.

24 Claims, 18 Drawing Sheets

VIRTUAL SYSTEMS MANAGEMENT

RELATED APPLICATIONS

This application claims priority to co-pending U.S. Provisional Patent Application No. 60/708,473, filed on Aug. 15, 2005, the contents of which are incorporated herein by reference.

BACKGROUND OF THE INVENTION

1. Field of the Invention

The present invention relates generally to computer network systems and, more particularly, to management of computer network virtualization environments.

2. Description of the Related Art

Information Technology (IT) management tasks can be characterized into two general areas, managing present day operations and forecasting capacity for future operations. Ensuring the well being of the current IT environment while using current trends to predict needs and trends for the future business needs is a fine balance and a highly refined skill. Management needs all the help and tools it can find to assist it in these tasks. Today, all major IT management platforms support the International Telecommunications Union (ITU) standard for Element Management Systems (EMS), wherein general functionality can be split into five key areas: Fault, Configuration, Accounting, Performance, and Security (FCAPS).

This conventional methodology has created an element-driven management system, with a focus on ensuring that each of the individual elements are running to their full potential. As the number of elements grew, the need for aggregated and correlated information increased. As the number of datacenter locations grew, the need for global visibility and control increased. Conventionally, IT capacity planning for day-to-day operations is typically carried out with a bottom-up data aggregation and with the use of forecasting methods such as trending, simulation, and custom analytics.

Capacity planning for resources is also typically completed when new business applications are rolled out or during an application upgrade cycle. In this capacity planning scenario, the planning is typically carried out at the individual device level, which is then multiplied by the number of consumers and/or producers and further multiplied by the number of locations that need to be supported, giving a large number in the aggregate: (number of individual devices)×(number of consumers/producers)×(number of locations requiring support).

In order to estimate what resource capacity an enterprise will need to support the core business applications it provides, an enterprise will typically evaluate the worst case usage scenario, and bolster its capacity to ensure that a worst case scenario will be adequately supported. What is often overlooked is that this type of worst-case capacity planning typically is driven by the vendors who have built ROI calculators that are to their benefit.

By planning and bulking up resources to combat this evasive worst case scenario, enterprises typically end up with under-utilized IT resources. Applying the Pareto Principle, an estimate of how much under-utilized capacity can exist in a single enterprise would be as follows: only 20% of the available capacity ends up being used during 80% of the time during a given timeframe.

Many improvements have been made in the enterprise scenario for management of IT resources. At the macro-level, IT resources can be classified into 4 categories: (1) client resources (client resource examples include desktop machines, wireless, handheld devices, client grids (such as SETI@home and the like); (2) server resources (server resource examples include mainframe, File Server, Web server, peer-to-peer servers, blade servers, grid servers etc.); (3) network resources (network resource example include routers, switches, bridges, infiniband, wireless, radio, optical, fiber channel, link aggregation technologies (such as BitTorrent and the like); (4) storage resources (storage resource example include databases, network attached storage, storage area networks, data grids etc.). While one can describe a capacity planning scenario for each of the categories above, they all follow a very similar capacity planning process.

In the following example, we will describe a typical server resource capacity planning scenario. Servers in the enterprise have evolved with new application architecture. Application topologies have evolved from Mainframe-Green Screen interaction, to Client/Server, to Client/Web Server/Application Server/Database, Peer-to-Peer, and so forth. Server resource capacity planning is typically achieved by stress-testing the application with a certain predetermined workload and a set, acceptable application response time. A hardware specification is defined to support a user-defined worst-case scenario. The application is rolled out on the new hardware into a production environment.

Server resource and application utilization is monitored by a FCAPS-compliant management platform to provide complete visibility over operations. In order to provide an aggregated summary view, such management platforms typically roll-up element-level metrics into higher level metrics through data correlation techniques.

Conventionally, with the emergence of resource virtualization and the increase in use of Web services, combined with service-oriented architectures (SOAs), the number of moving pieces that need to be managed for the enterprise continues to rise. For example, imagine an enterprise running composite applications. That enterprise would include using a mixture of legacy, local, and external Web services, running on virtual infrastructure spread globally across the enterprise, and frustrated end users can't complete their mission critical business tasks. It is difficult to achieve sufficient visibility and control to manage such an environment, and knowing where to begin to manage such an environment can be difficult.

Traditional methods of resource planning at the individual physical resource level begin to show their age. For example, correlation and aggregation of element level data also becomes compute-intensive with the increase in the number of managed elements. It has been said that "The information technology industry is in a strange situation. We have enormously sophisticated engines that we're running—in the form of CPUs and communications equipment and so forth, but the way we keep them running is through an outdated vision." Doug Busch, Intel Vice President and CIO-Technology quoted in Intel Magazine, September/October 2004 (available at the URL of: www.intel.com/update/contents/it09041.htm as of June 2005). Management of virtual assets can be achieved conventionally with virtualization software tools, but such techniques are typically labor intensive and require manual selection and implementation of configurations and utilize relatively cumbersome configuration change management.

In network systems, with virtualization, it is possible to deploy physical resources in the form of virtual assets. The assets can thereby provide the functional equivalent of desktops (user interfaces), operating systems, applications, servers, data bases, and the like. Adding additional applications can be implemented by remotely executed software operations in virtual environments on one or more computers, rather than physical installations involving personnel with an installation CD media at each physical location (computer) of a network where the additional applications are desired.

The management of such virtual assets, however, is becoming increasingly complex and unwieldy. Many tools to assist in the management of virtualization environments are proprietary and work only with virtual environments from particular vendors. Similarly, some virtualization tools might only work with specific central processor units (CPUs) of machines that host the virtual environment, or might only work with specific operating systems or virtualization platforms of either the host machine or in the virtual environment. This characteristic can make it necessary to have multiple tools on hand for the various platforms and vendors that might be deployed throughout a network, as well as making it necessary to acquire and maintain the skill sets necessary to use such tools. The mere fact of requiring such diverse tools is, itself, inefficient. Thus, although virtualization trends show much promise for more efficient utilization of physical resources by optimal deployment of virtual assets, the virtualization environment management task is daunting.

It would be advantageous if more efficient means for managing virtual environments across computer networks were available. The present invention satisfies this need.

SUMMARY

The present invention provides methods and apparatus for management of one or more virtual environments regardless of any underlying central processing unit (CPU) specification and regardless of any underlying operating system (OS) or virtualization environment. In one embodiment of the present invention the virtualization environment is managed through a Control Center application that provides an interface to virtualization environments in communication with the Control Center computer. The system, through the Control Center, provides active management of the virtualization environment by initiating automatic responses to operational situations that influence dynamic demands on the physical resources and virtual assets. In this way, multiple virtual environments can be managed through a single user interface of a Control Center application even where the underlying CPU of the system physical resources are different from that of the Control Center, even where the operating systems of the Control Center, physical resources, and virtual assets are different, and even where the virtualization environments being managed are different from each other.

In one embodiment, the Control Center can comprise a collection of functional elements characterized as an Asset Manager, a Provisioning Manager, a Dynamic Application Router, an Optimizer, a Performance Manager, and a Capacity Planning Manager. With these functional elements, the process of managing the virtual environment comprises a sequence of building an inventory of available physical resources and virtual assets, provisioning the assets for a desired network virtual configuration, optimizing the mix of physical resources and virtual assets, reporting on the system performance, and planning for future trends and forecasting for needed capacity.

In another embodiment, management of computer network virtualization environments is provided by performing one or more functions from among the set of functions including (1) identification and management of network resources and virtual assets, (2) provisioning of virtual assets in response to network workflow demands, (3) dynamic deployment of virtual assets across the computer network, (4) performance measurement and reporting of resources and virtual assets, and (5) planning and forecasting of resource demands and asset utilization of the virtualization environment, such that the functions are carried out without regard to processors, operating systems, virtualization platforms, and application software of the virtualization environment. In this way, an inventory of resources and assets available at a network virtualization environment is determined, prioritization is assigned to an inventory of available resources and assets, and the inventory is utilized by allocating the virtual assets in the virtualization environment. The allocated virtualization environment is automatically managed by determining real time performance metrics for the environment, and producing a reallocation of the inventory based on the real time performance metrics. In this way, automatic and efficient virtualization management of a computer network is provided.

Other features and advantages of the present invention should be apparent from the following description of the preferred embodiment, which illustrates, by way of example, the principles of the invention.

BRIEF DESCRIPTION OF THE DRAWINGS

Various embodiments of the present invention taught herein are illustrated by way of example, and not by way of limitation, in the FIG. s of the accompanying drawings, in which.

Figure 1:
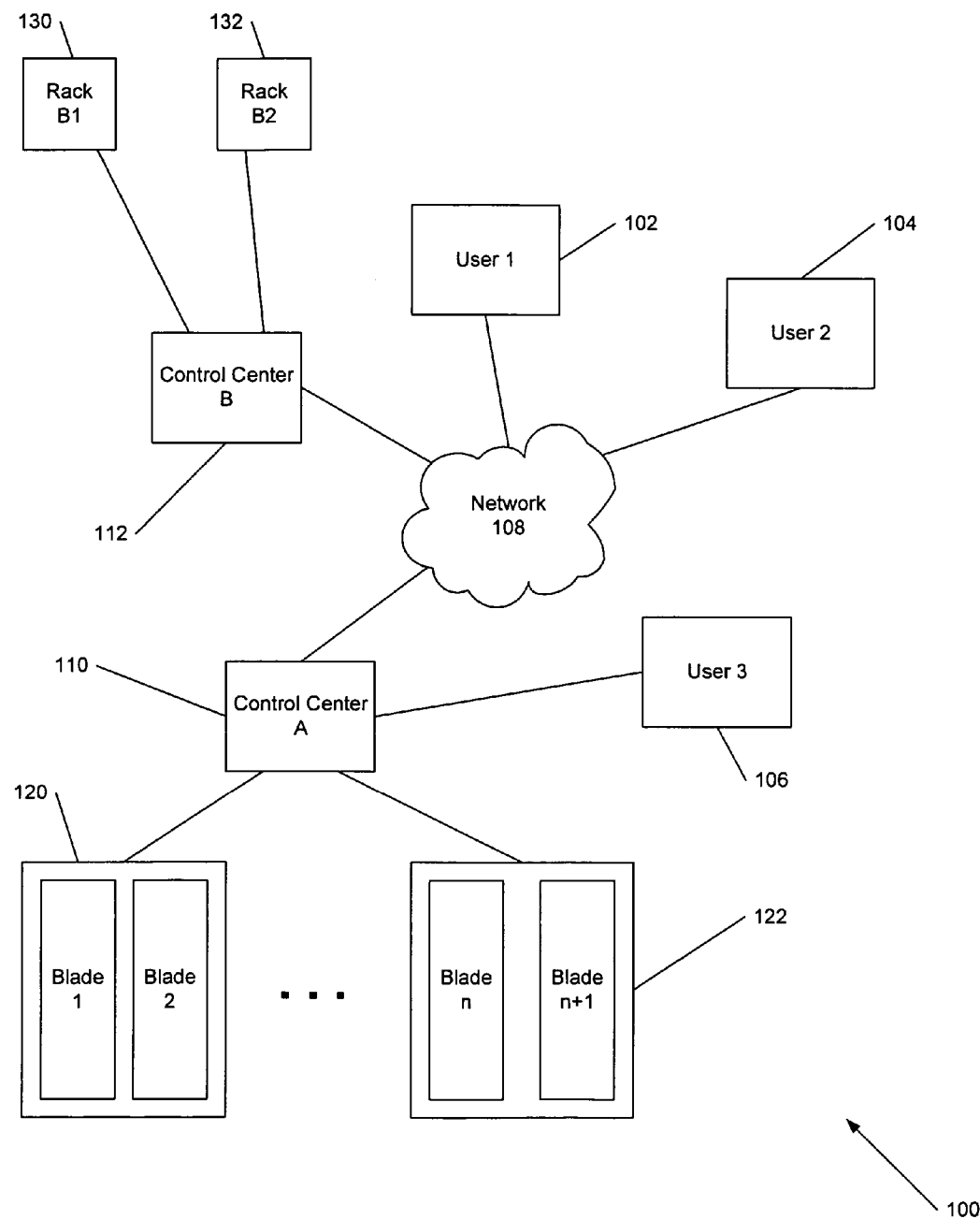
FIG. 1 is a schematic diagram that illustrates a virtualization system embodiment constructed in accordance with the invention.

In the drawings, like reference numerals refer to like structures. It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

FIG. 1 is an illustration of a network implementation of a virtualization environment 100 constructed in accordance with the invention for virtualization system management such that resource utilization is highly leveraged. Users at network computers 102, 104, 106 can communicate over a network 108 to gain access to system resources that are available through Control Center computers such as Control Center A 110 and Control Center B 112. Each of the Control Center computers 110, 112 executes application software and thereby manages one or more virtual environments regardless of any underlying central processing unit (CPU) and regardless of any underlying operating system (OS) or virtualization platform software. For example, a Control Center computer can manage resources and virtual assets that are powered by CPUs from Intel Corporation of Santa Clara, Calif. USA or from Motorola, Inc. of Schaumberg, Ill. USA, or other vendors. The physical resources and virtual assets can be managed from the Control Center computers whether the underlying OS of the computers, resources, and assets is a Windows-based OS from Microsoft Corporation of Redmond, Wash. USA or a Macintosh OS from Apple Computer Inc. of Cupertino, Calif. USA or others, and whether the virtualization environment is a platform by VMWare, Inc. of Palo Alto, Calif. USA or International Business Machines Corporation of Armonk, N.Y. USA or others. Operating parameters of the virtualization system management can be specified and changed at the Control Center computers 110, 112 through a user interface that is provided by the application software described herein executing at the respective Control Center computers 110, 112. The Control Center computers are represented in FIG. 1 as physical devices rather than virtual assets. Deployment of the Control Center on physical devices is typical, because otherwise a Control Center that is deployed on a virtual asset would leave the users with being dependent on their virtualization platform for configuration management and the like, in addition to the usual machine dependencies.

In this description, physical devices such as computers, printers, routers, and other "boxes" will be referred to as resources, whereas virtual devices that exist only as software instantiations of equipment objects in a virtual environment will be referred to as virtual assets. The resource-asset dichotomy will be maintained throughout this discussion.

The present invention provides automated management of network-based virtual environments through Control Center software that supports on-demand operation of one or more functions including (1) identification and management of enterprise resources and virtual assets, (2) provisioning of virtual assets in response to network workflow demands, (3) dynamic deployment (routing) of virtual assets across the network, (4) performance measurement and reporting of virtual assets and resources, and (5) planning and forecasting of resource demands and asset utilization. Such operations are carried out without regard to the mix of otherwise proprietary processors, operating systems, virtualization platforms, application software, and protocols. These features and functions are provided in a modular fashion so that desired functions can be included in the system, and functions not desired can be excluded from the system. In any implementation in accordance with the present invention, the virtualization management system is transparent to the virtual environment being managed, in that the system can support multiple virtual environments with different protocols and operating specifications. Thus, the disclosed system is platform-independent.

FIG. 1 shows that the users 102, 104, 106 can communicate with the Control Centers 110, 112 through a network 108, which can comprise a local area network, a wide area network, or through an extended network such as the Internet, or any other network for communication among multiple computers. FIG. 1 also indicates that the users can be connected directly to a Control Center computer, if desired, such as for the user 106 indicated as User 3.

Each Control Center computer 110, 112 that is equipped with the virtualization management application described herein will have management of one or more physical assets within a domain or other subnet arrangement associated with the respective Control Center. FIG. 1 shows that Control Center A 110 manages multiple resources, two of which are shown: a first set of resources 120 and a second set of resources 122. For ease of illustration, each set 120, 122 may be considered in the context of a computer rack system containing multiple computer physical assets. It should be understood that additional physical resources can be managed by the Control Center A, but are not shown in FIG. 1 for simplicity of illustration.

The first set of resources 120 are illustrated as comprising two blade servers, indicated in FIG. 1 as Blade 1 and Blade 2. The second set of resources are illustrated as comprising two additional blade servers, Blade n and Blade n+1. Thus, a number of different resources can be accommodated. It should be understood that the resources could comprise other devices or equipment, such as memory devices, printers, routers, and the like. It should also be understood that the blade servers themselves (Blade 1, Blade 2, . . . , Blade n, Blade n+1, ... ) can be configured to support a variety of virtual assets, including desktop computer environments, data storage, application servers, routers, and the like. FIG. 1 shows that Control Center B 112 manages two sets of resources, illustrated as Rack B1 and Rack B2. As with the Control Center A, it should be understood that the actual physical resources that make up Rack B1 130 and Rack B2 132 can comprise a variety of network-based computer equipment.

Figure 2:
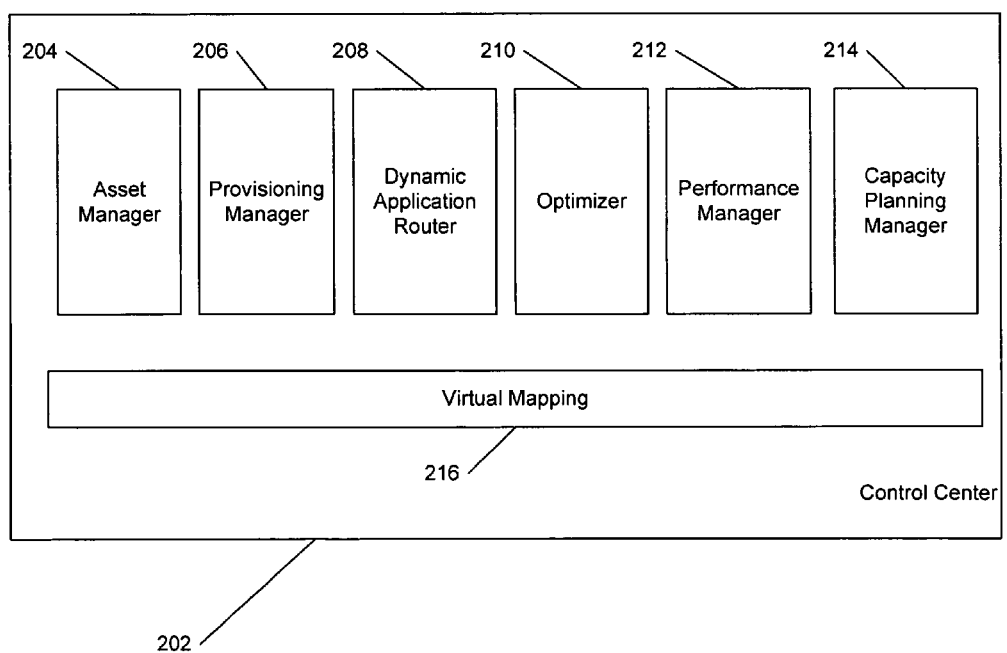
FIG. 2 is a schematic diagram that illustrates the Control Center components for the Control Center computers illustrated in FIG. 1.

FIG. 2 is a schematic diagram that illustrates the application components for the virtualization management application of the Control Center computers 110, 112 illustrated in FIG. 1. The components enable the Control Center computers to function according to the description herein to provide automatic, network-based virtualization management independently of underlying processors, operating systems, and virtual environments. FIG. 2 shows the Control Center computer as including an Asset Manager 204, a Provisioning Manager 206, a Dynamic Application Router 208, an Optimizer 210, a Performance Manager 212, and a Capacity Planning Manager 214. In addition, a Virtual Mapping engine 216 is included, for determining the physical resources and virtual assets with which the Control Center will communicate. The Virtual Mapping engine is programmed to discover the physical resources, such as the physical devices with which the Control Center is in network communications, and also the virtual resources, such as virtual servers, storage, desktops, and the like with which the Control Center has access. The Virtual Mapping engine 216 can be self-starting, such as being launched at Control Center start-up or at some other predetermined system event, or the Virtual Mapping engine can be initiated by a user via a command.

As described further below, the illustrated embodiment of the Control Center 202 is configured in a modular fashion, such that the installation of the Control Center of the computers 110, 112 in FIG. 1 need not include every one of the modular components 204-214 illustrated in FIG. 2. Rather, system requirements and user needs may be such that less than all of the Control Center components are installed on any one Control Center machine of the system. Any installation of the Control Center, however, will include the Virtual Mapping engine 216, so that the Control Center will be suitably informed of its environment. A more detailed description of the functionality for each of the modular components 204-214 is provided below.

Asset Manager

The Asset Manager 204 provides visibility and management of all global virtual assets available to the Control Center. This component provides a global view of all the resources used in a virtualized infrastructure along with a physical and logical topology view. Thus, a user can view a global topology view and an inventory of virtual infrastructure from a central console. In addition, the component will support discovery and configuration of virtual resources, allow topology views for physical and logical infrastructure, provide inventory reports at local, remote, and global context, and simplify management of applications, hardware resources, virtual assets, and operating systems.

Provisioning Manager

The Provisioning Manager 206 provides an on-demand solution for provisioning of virtual assets for an automated workflow management. This component provides an automated solution allowing users to request and schedule their individual virtual asset needs and IT management to prioritize and provision the required assets on demand. The component can be used to provide a portal for users' virtual asset requests showing available virtual assets, as well as a supervisor portal to prioritize needs and approve asset needs by time and priority, and also provides an IT manager to provision the needed resources and keeping track of used and available assets, an automated workflow system for users and IT to track needs and resources, supports the ability to keep mission critical application and assets to put them on line on demand for emergency and disaster recovery needs, and provides a repository of virtual machines supporting VMWare, Microsoft and Xen virtual assets and their needed hardware components. The Provisioning Manager provides central management of global virtual machine images, provides an enterprise workflow system for adds, moves and changes in virtual infrastructure, and can be used to standardize and optimize virtual infrastructure use from lab to production environment, such as needed in different development testing scenarios.

Dynamic Application Router

The Dynamic Application Router 208 provides real time and dynamic routing of applications running on virtual infrastructure. With this component, users of the Control Center can move applications running on virtual assets by comparing application usage with business policy and drivers, and scheduling appropriate routing actions. This component can be used to move applications to different virtual assets as global business need changes, provide dynamic allocation of global virtual assets for workload optimization, enable zero down time in upgrading virtual environments, provide an optimizer for balancing resource and asset inventory against needs, a scheduler to auto schedule actions and provide reports, and provide alarms and triggers to notify users of out of balance inventory items. The component also provides an aggregated action library for all virtual infrastructure, performs zero downtime virtual asset maintenance and upgrades, ensures a high availability plan for mission critical applications running on virtual infrastructure, can compare business policy against real time asset usage and then make load balance changes, and can provide top 10 recommendations for solutions.

Optimizer

The Optimizer 210 component operates on the virtual assets of a physical resource to provide efficient configuration of the assets in accordance with a set of business rules. For example, the Optimizer component may operate on a user desktop or on a server that manages a virtual environment so as to configure an efficient combination of applications and assets, such as virtual devices of the host machine. In this way, the Optimizer provides a user with control over how virtual assets use the underlying physical resources. Users can set business policies based on application criticality and can let the Optimizer allocate appropriate physical resources in accordance with the business policies. The Optimizer can allocate resources such as CPU, network, memory, hard disk, and the like in accordance with the business policies that have been set by the user. Configuration of the business policies lets the user have a high degree of control over the allocation of resources. For example, users can set a maximum limit on how much each virtual asset can use the underlying physical resource.

Performance Manager

The Performance Manager component 212 provides availability and performance management for all virtual assets in the system. This component shows performance of virtual asset usage, provides key performance matrices and metrics, and identifies future potential bottlenecks. The component can be used to provide real time monitoring and viewing of all virtual assets usage, measure and trend performance and show it against plan, provide triggers, alerts, and alarms for key performance matrices and metrics, identify current and predicted bottlenecks, and provides a cross-platform solution.

Capacity Planning Manager

The Capacity Planning Manager component 214 provides capacity planning, trending and forecasting based on usage and needs. This component provides capacity planning, trending and forecasting of virtual assets based on historical trends and future projected business needs. The component can be used to show used versus available capacity of virtual assets, trends capacity usage and compares it with thresholds, provides historical trend reports, provides forecasting of future needs, and provides alarms and triggers based on capacity usage and thresholds.

Figure 3:
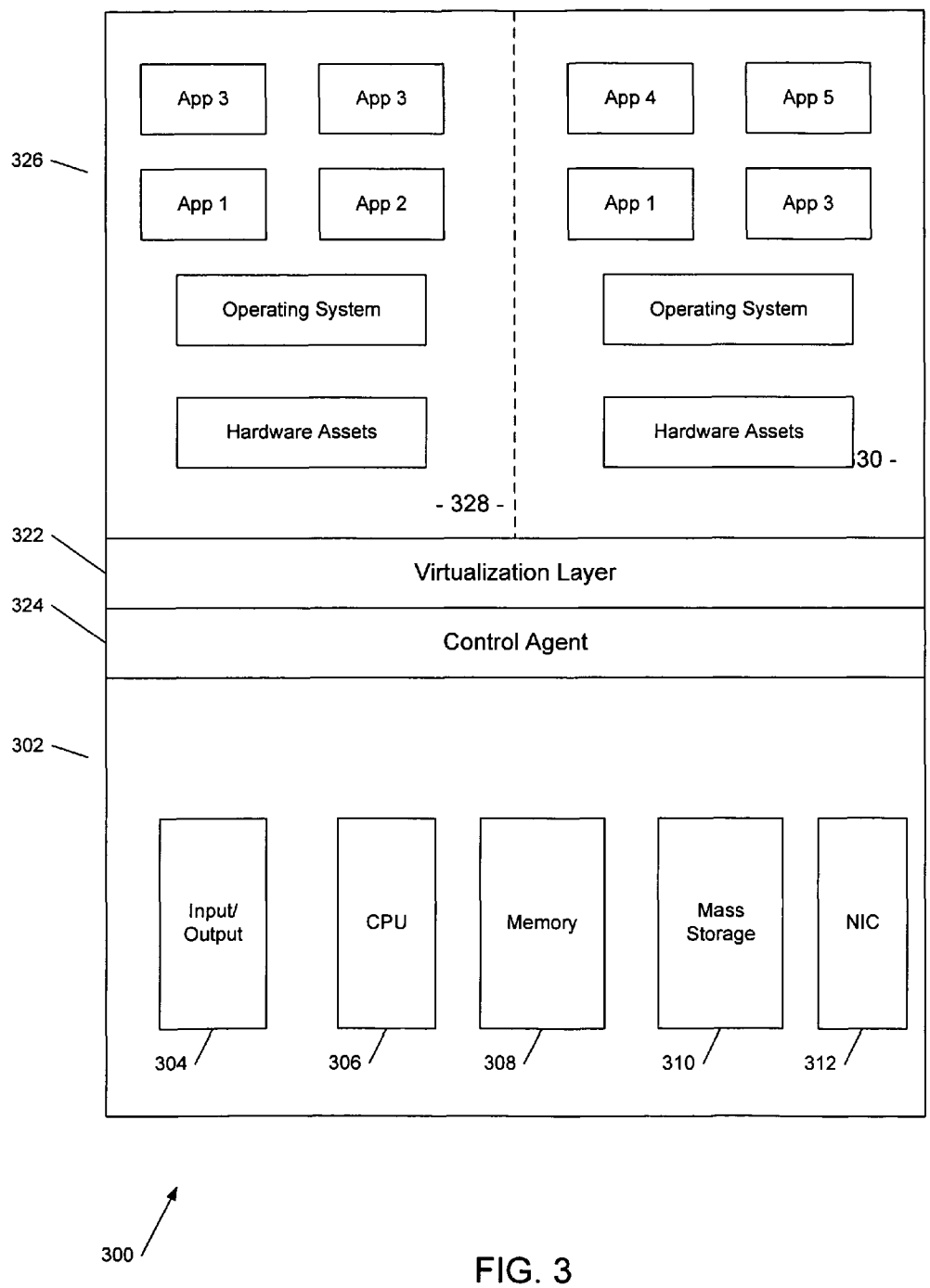
FIG. 3 is a schematic diagram that illustrates the configuration of a virtualization platform network computer shown in FIG. 1.

FIG. 3 is a schematic diagram that illustrates the configuration of an embodiment of a network computer device 300 constructed in accordance with the present invention to provide a virtualization environment that is managed by the Control Center described herein. The computer device is, therefore, a physical resource of the network 100. For example, the computer device 300 can comprise a blade server, such as one of the blade servers 120, 122 illustrated in FIG. 1. That is, the computer device 300 can comprise a desktop computer system, a laptop, a blade server, conventional server, or other computing machine that includes hardware components 302. In FIG. 3, the hardware components are illustrated as including input/output facilities 304 (such as keyboard, display, mouse, and printer facilities), a central processor unit (CPU) 306, memory 308, mass storage 310 (such as disk drives), and a network interface card 312 for network communications. Those skilled in the art will understand that not all of the hardware components shown are necessary for successful operation of the computer device 300 in the network 100. The hardware components of the device 300 will depend on the system requirements and the function of the device within the network.

The computer device 300 includes an application that provides a virtualization layer 322 that manages virtual assets 326. Thus, the computer comprises a host machine for the virtualization environment. In FIG. 3, the virtual assets are illustrated as two virtual computers, or machines, a first Virtual Machine 328 and a second Virtual Machine 330. Each virtual machine can include an operating system (OS) for the virtual machine, computer applications programs executing on the virtual machine OS, and virtual hardware assets for the virtual machine. In FIG. 3, the first Virtual Machine 328 is shown as including an application program "App 1", an application program "App 2", and two instances or copies of an application program "App 3". The second Virtual Machine 330 is shown with one instance of App 1, one instance of App 3, and single instances of applications App 4 and App 5. As noted above, any one of the computer host machines, or boxes, of the network 100 can include a greater or lesser number of virtual machines. Two virtual machines are shown in FIG. 3 for purposes of illustration. Likewise, a greater or lesser number of applications running on the virtual OS can be provided. There is similar flexibility in the configuration (type and number) of OS and hardware assets of each virtual machine.

In accordance with the invention, a Control Center (such as illustrated in FIG. 2) manages the virtual assets of each computer host machine 300 for which the Control Center is responsible. To accomplish such functionality, the Control Center must communicate with the virtualization layer of the host machine. FIG. 3 shows that a Control Agent 324 can be installed on the host machine 300 to facilitate such communication. The Control Agent 324 provides an interface between the hardware resources 302 of the host and the Virtualization Layer software 322. The Control Agent 324 facilitates communication between the external Control Center components 204-214 (FIG. 2) and the Virtualization Layer 322 of the host machine, and provides a common interface to the variety of virtualization software that might be available on the host machine. For example, the Virtualization Layer may be provided by products from VMWare, or Xen, or Microsoft, or IBM Corporation, or other visualization platforms or emulation interfaces. In this way, the Control Agent acts as a universal adapter between the Control Center and the virtualization layer platforms of the host machines in the network. In some cases, it might be possible for the Control Center components (FIG. 2) to communicate directly with the Virtualization Layer 322 without need for a Control Agent 324, in which case there will be no Control Agent 324 installed at the host machine.

For example, if the Asset Manager component 204 can communicate directly with the Virtualization Layer using native interfaces of the virtualization layer, then the Control Agent 324 is not needed. This would likely be the case if, for example, the virtualization layer is provided by VMWare, which includes controls needed for external communications. Other virtualization software, such as provided by Xen and Microsoft, does not typically include such native controls and therefore a Control Agent 324 would be necessary. Those skilled in the art will appreciate that such controls typically include actions such as "Move VM", "Migrate VM", "Clone VM", and the like, which support movement, migration, and cloning of virtual machines and which usually can be invoked programmatically by all virtualization platforms. It is these controls that may be implemented by the Control Agent 324, in the absence of a native control in the virtualization platform. If the host machine does include a Control Agent 324, then the Control Agent 324 will have components to facilitate communication between the Control Center and the Virtualization Layer 322. In an alternative embodiment, the Control Agent 324 can be integrated into the Control Center itself, such that the Control Center can communicate directly with the Virtualization Layer 322 of the host machine, regardless of the virtualization middleware that is actually installed at the host machine. Those skilled in the art will understand how to integrate the functionality of the Control Agent 324 described herein into the Control Center, without further explanation, in view of the description provided.

Figure 4:
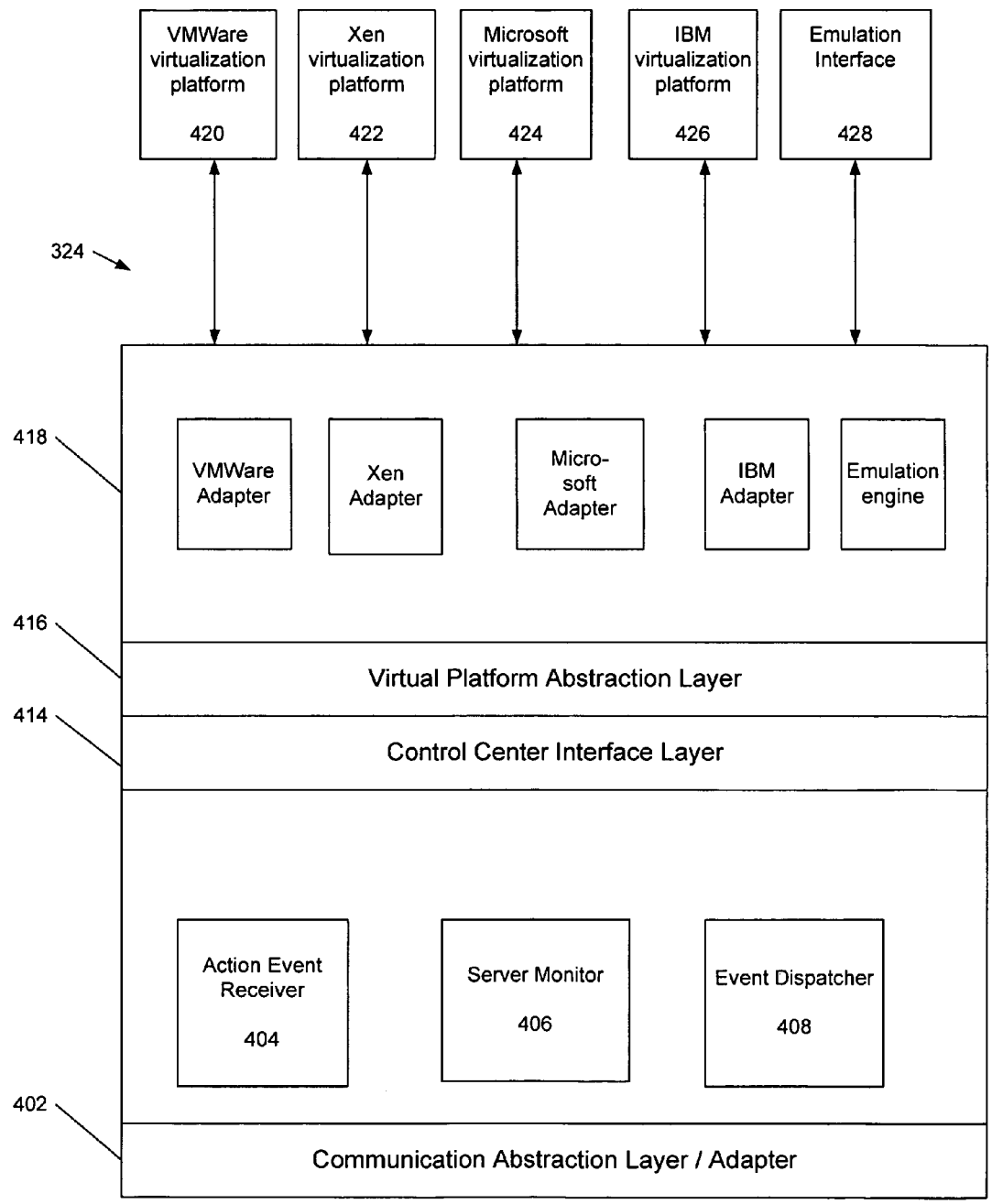
FIG. 4 is a schematic diagram that shows the construction of the Control Agent in the computer of FIG. 3.

FIG. 4 is a schematic diagram that shows the construction of the Control Agent 324 with components for virtualization communication and management. These are the components that enable the Control Agent 324 of a host machine (that is, the machine on which the Control Agent 324 is installed) to communicate with the Control Center of an external network machine. FIG. 4 shows that the Control Agent 324 includes a Communication Abstraction Layer/Adapter 402. This component ensures that the Control Agent 324 can communicate with the hardware resources of the host machine, such as network communications devices, through which the Control Agent 324 can send and receive data with one of the external Control Centers 110, 112.

In the Control Agent 324, an Action Event Receiver 404 receives notifications about incoming events for which a response or action is required. Such notifications will typically involve, for example, changes in status of a virtual machine or requests for action or service. The Control Agent 324 also includes a Server Monitor 404 that checks for status of the virtual applications of the host machine, and also checks the status of the external Control Center with which it is communicating. As noted above, each host machine is associated, or managed, by a designated Control Center. The Control Agent 324 also includes an Event Dispatcher 408, which initiates actions by the host machine in response to the incoming events received by the Action Event Receiver 404. A Control Center Interface Layer 414 provides a monitoring interface function, a management interface function, and a statistics interface function for data exchange between the Control Agent 324 and the associated Control Center. A Virtual Platform Abstraction Layer 416 permits communications between the host machine 302 resources and a set of multiple middleware adapters 418, as described further below.

In the server virtualization of the illustrated embodiment, the Control Agent 324 acts as a proxy between the Control Center 110, 112 and server instances. The Control Agent manages the messaging between the Control Center and the actual VMs. The Control Agent 324 will be created per host and per VM, as required. The Control Agent communicates with the Control Center through a communications protocol, such as the WS Management Catalog Protocol specification, wherein the Control Agent 324 is implemented as a service and will have the set of virtual assets that it manages. Other communications schemes can be used, as will be known to those skilled in the art. The VM's and Hosts are the available resources, as specified by the protocol. The Control Agent 324 is assigned a unique URI and will provide a selector to select a VM instance running within the server.

The Control Agent 324 can create a VM using a Resource configuration feature. The Control Agent 324 is responsible for a variety of tasks, including:
  collecting Statistics from the VM's and hosts;
  monitoring the health of the VM's and hosts;
  generating Alarms when the VM's are out of balance;
  monitoring the various events generated by the VM's and sending an appropriate alert to the Server;
  communicating the VM/host status to the server;
  performing management actions such as Create a VM, Suspend VM, Stop VM, and Move VM.

The Control Agent 324 also supports communication between the Abstraction Layer 416 and different Virtualization servers (virtualization platforms). The Abstraction Layer supports interfaces for monitoring, managing, and collecting statistics from the VMs and hosts.

The Control Center 110, 112 can start the Control Agent 324. The Control Agent 324 has its lifecycle independent of the Control Center and can handle reconnection with the Control Center, when it starts.

The Control Agent 324 also controls and monitors the health of the host machine. The Control Agent 324 is responsible for mining the system performance statistics such as the network performance, memory usage, and the disk usage of the host and passing these statistics on to the Control Center.

If a particular VM fails, the Control Agent 324 tries to restart the VM, or if that fails, sends out an alarm message to the virtual server.

Data constructs, such as Communication Objects, implement the communication protocols between the Control Agent 324 and the Control Center 110, 112. The communication protocol can be based on the WS Catalog protocol, in use by VMWare. Other suitable protocols will occur to those skilled in the art, in view of this description.

The Control Center has virtualization management responsibilities that include:
  managing/monitoring Control Agents 324;
  triggering Business Rules in the case of Alarm messages;
  launching/moving applications to different virtual machines based on the VM work load (the Server makes the decisions and the request is sent to the Control Agent 324 to perform the operation;
  balancing workload across different hosts/VM's;
  performing Scheduled events;
  re-initiating a Control Agent 324 in case of a failure;
  aggregating the performance statistics across all the Control Agents 324;
  providing management API's for the Control Center console (user interface) with which an administrator can monitor/manage individual host machines (physical devices) and VMs.

The Control Center includes the following functional components to perform the above-mentioned responsibilities:
  an Event Receiver that receives messages from the Control Agent 324 and passes them on to an Action Manager. The Event Receiver is also responsible for generating a timeout event that will be triggered if no Ping/Alarm/Report Status messages are received after a configured period of time;
  a Host Monitor that sends out heartbeat messages s to the Control Agent 324 (similar to a ping) to ensure that the host is available. When a Host Monitor detects that a host is not available, it will provide the Host Manager with that information;
  Host States, which include two distinct states, from the point view of other machines managed by the server: either Offline, in which the host is not a fully active member of the virtualization infrastructure, wherein the host and VMs deployed may or may not be running; and Online, in which the host is a fully active member of the virtualization infrastructure, wherein the host maintains heartbeats, mines system performance statistical data, and can own and run Control Agents 324;
  a Host Manager that is responsible for controlling host machines with Control Agents 324. For each Host, the Host Manager will launch one Control Agent 324. When a Host Monitor detects that a host is not available, the Host Manager tries to send a double-check ping message to the suspected unavailable host. If that host does not respond, the Host Manager will first try to launch a new Control Agent 324 process over that host before changing the Host State to indicate it as 'Offline' and implementing fail-over of its VM's to other Hosts;
  a Scheduler that is responsible for scheduling applications based on a business policy. The Scheduler generates a set of actions to be performed based on certain business rules and the business policy. The actions are passed on to an Action Manager. The Action Manager is responsible for executing the actions;
  an Action Manager that receives actions from the Event Receiver, Host Manager, and the Scheduler. The choice of host for performing actions such as CreateVM, MoveVM is made by a Load Balancer process. The Action Manager submits a list of hosts and VM actions to the Load Balancer process. The Load Balancer, based on certain business rules and also the load on the hosts, maps the VMs to the host machines.

Figure 5:
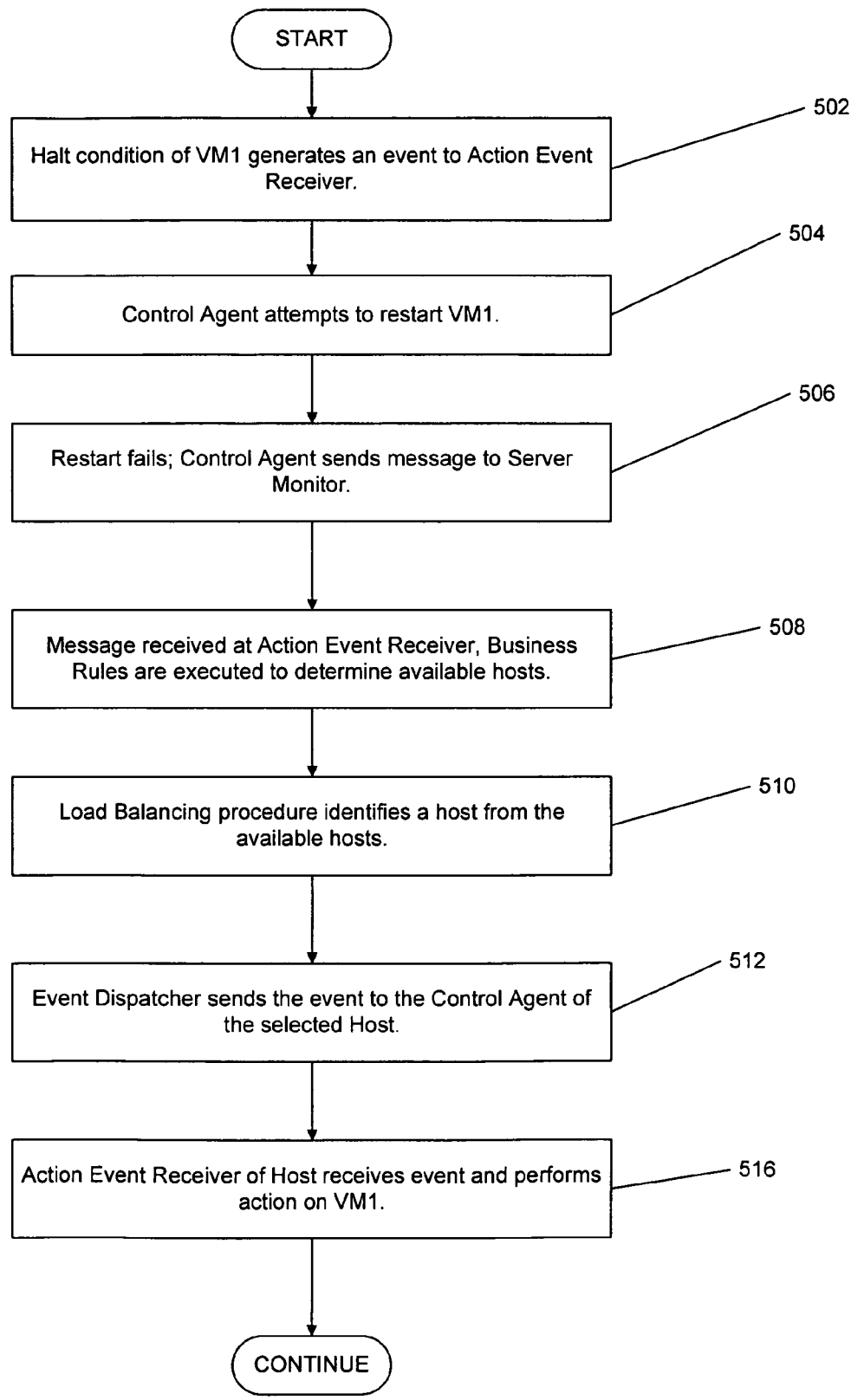
FIG. 5 is a flow diagram that illustrates the operation of the Control Center and Control Agent.

The operation of the components described above can be better understood with reference to FIG. 5, which illustrates the operation of the Control Center and Control Agent 324. The operation of FIG. 5 begins with a halt condition of a VM, for example "VM1", which generates an event message that is sent to an Event Receiver of the Control Center. This condition is represented by the diagram box numbered 502. Next, at box 504, the Control Agent attempts to restart VM1. In this example, the restart fails, and therefore the Control Agent 324 sends a message to the corresponding Server Monitor (box 506). That is, a condition is detected by the Control Agent 324 and, once detected, the Control Agent 324 will attempt to rectify the condition. If that attempt fails, then the Control Agent 324 informs the Control Center with an event message and the Control Center processes the event with the Event Receiver.

At box 508, the Control Agent 324 message is received at an Event Receiver, and Business Rules are executed to determine the available hosts for supporting the type of virtual machine that has failed. At box 510, the Load Balancing procedure identifies a host machine from the list of available hosts. Next, at box 512, the Event Dispatcher sends the failure event message to the Control Agent 324 of the selected host machine. Lastly, the Action Event Receiver of the selected host machine receives the event message and performs the action (startup VM) to restore the failed virtual machine.

Returning to the description of FIG. 4, the Control Center Interface Layer 414 enables the Control Agent 324 to communicate with the associated Control Center to provide the Control Center with information about the status of the host machine (monitoring function), receive instructions and commands from the Control Center (management), and report on operational information (statistics). Thus, the Interface Layer extends these three functional areas involving administration, monitoring, and performance statistics.

The Administration aspect of the Control Agent 324 provides all the methods that are required for managing a virtual server, such as the GSX/ESX server platform from VMWare, and the virtual machines under its supervision. All methods related to starting, stopping, cloning, and moving a virtual machine are managed through the Administration interface.

The Monitoring aspect of the Control Agent 324 provides methods to check virtual machine status and review heartbeat information for a virtual machine. The monitoring interface includes methods to get the statistical information and compare it with specified thresholds and generate Action Events. The Control Agent 324 operation includes a "getAllEvents" method that validates each threshold value and generates the necessary Action Events.

The Statistical aspect of the Control Agent 324 collects the statistical information. The methods used by the Control Agent in these duties are responsible for obtaining performance statistics for CPU performance, disk performance, memory performance, and network performance. Those skilled in the art will understand the various performance metrics by which such performance is typically judged. The Control Agent 324 operation therefore includes methods such as getCPUperfStats, getDiskPerfStats, getMemoryPerfStats and getNetworkPerfStats, which are responsible for returning corresponding specific statistical objects such as CPUStats, DiskStats, MemoryStats, and NetworkStats. These methods are supported for a variety of servers, such as ESX servers, and some servers will require the Control Agent 324 to make system calls to obtain the information, such as for GSX servers.

As noted above, the Virtual Platform Abstraction Layer 416 of the Control Agent 324 includes a set of multiple middleware adapters 418. The middleware adapters communicate with the virtualization environments of the host machine 302. These virtualization environments are shown in FIG. 4 as including platforms by VMWare 420, Xen 422, Microsoft 424, IBM 426, and also emulation solutions 428. It should be understood that these depicted platforms are for purpose of illustration only; additional or alternative virtualization platforms can also be accommodated.

To provide an abstraction layer over a variety of virtualization servers such as from VMWare, Xen, and Microsoft, the Abstraction Layer 416 of the Control Agent 324 provides a common API access for the virtualization servers. To do so, the Control Agent 324 includes components in accordance with the virtualization platform and communication management protocol, components such as:

a Communication Object Layer that manages services management events and translates to corresponding method calls, in accordance with the communication management protocol in use for the virtualization platform, such as JMS Events and in the case of the VMWare virtualization platform;

an Agent Interface comprising a generic interface that supports at least three interfaces including Administration, Monitoring, and Statistics, and uses a factory pattern to create an Agent Object specific to VMWare, Xen or Microsoft, or whatever the virtualization platform as desired;

a Virtualization Platform Agent, such as a VMWare Agent as an implementation class for an Agent Interface that is specific to VMWare platforms, and which uses JNI to call the COM layer on MS platform and uses JPL on Linux and Solaris;

a JNI DLL comprising an ATL dll that wraps the VMCOM object, wherein the COM functionality is exposed as method calls that can be accessed through JNI;

VMCOM interfaces, such as VMserverCtl, VMCtl, IConnectParams;

a VMIQAgent that is designed to be a web service with certain exposed methods, which for applicable communication management protocols may comprise a JMS Client application that produces/subscribes to certain sets of events for the required communication protocols. On startup, the VMIQAgent will use the Agent Factory class to create the VMWare Agent object. The information about the Virtualization server can be maintained as a part of the Agent Configuration file, which will only maintain the Virtualization server name, such that the details of the server, such as whether it is a GSX Server or ESX Server, will be obtained by querying the server itself.

For example, the Control Agent 324 may include a "VMWareAgentImpl" class for implementation of a Control Agent 324 interface to VMWare systems. This implementation class makes calls to classes called "VMServerCtl" and "VMCtl", wherein the VMServerCtl class includes methods related to the GSX and ESX servers. The VMServerCtl class is implemented as a singleton class. There would be only one instance of the Server object. This discussion assumes that there will be only one server per host (GSX server or ESX server). A host will not have the virtual machines of multiple virtualization servers (such as VmWare, Xen, and Microsoft). The server object will maintain a map of the VMName-to-VMCtl objects. The lookup will be on VMNames. The user can give the same name to multiple virtual machines on a server. Currently, VMWare does support duplicate names. The VMCtl and VMServerCTL classes invoke the com/perl interfaces of VMWare using JNI wrapper and JPL, respectively. The JNIWrapper is a DLL file which exposes methods from the VMCOM object.

The operations of the Control Center and Control Agent 324 to manage the virtual environment will support various use cases, or operating scenarios, including creation and startup of virtual machines (VMs). Such operations are described as follows for a VMWare environment (corresponding operations for other virtualization environments will be known to those skilled in the art, in view of this description):

Create VM
1. In order to create a VM on a particular host, the VM Manager first copies the "vmdk" file and the "vmx" file to the host machine using ssh and then send an event to the host.
2. The event message contains the following information
VM Name—Name of the VM to be created
VMTemplateInfo—Template details include type of server, location of the vmx and .vmdk files.
3. The event is received by the Control Agent 324.
4. createVM method is invoked by passing the VMName and the template info
5. VMWareAgentImpl class then modifies the display name to the VMName and the vmdk file reference in the vmx file.
6. VMWareAgentImpl class then checks for an existing VM with the same name and checks to see if the configuration file is the same. If not, then registers the VM with the GSX/ESX server.

StartVM
1. VM Manager sends an event to the VMIQAgent on a particular host to start a VM. The message contains the VMName.
2. The VMIQAgent receives the message and then calls the VMWareAgentImpl's StartVM Method.
3. VMWareAgentImpl looks up the VMCtl object corresponding to the VMName in the VMMap
4. Calls a StartVM method of the VMCtl object by passing the vmx file name.
5. The StartVM method returns a task handle.
6. The task status is monitored by the VMWareAgentImpl
7. The VMCOM object returns a task handle. If the task state is completed then the Completed status is returned to the Manager.
8. The VMWareAgentImpl class monitors the task status.
9. If the task status is VM_QUESTION, then a new event is raised to the VM Manager with the QuestionInfo as the message.
10. The event is received by the VMManager—Either through an autoresponse or a manual process an answer is sent back to the VMIQAgent
11. Control Agent 324 receives the message—Message has a reference to the VMName, task id and the answer.
12. VMWareAgentImpl then calls answerVM method of the VMCOM object to set the answer.
13. Procedure is repeated till the task status is set to completed.

Other actions can be supported by suitable methods, as desired:
1. CreateVirtualDisk
2. ChangePermissions
3. Consolidate_VM
4. Snapshot_VM
5. Revert_VM
6. Enable/Disable host
7. Configure CPU, Configure disk, Configure memory, configure Host, Configure Network.

Figure 6:
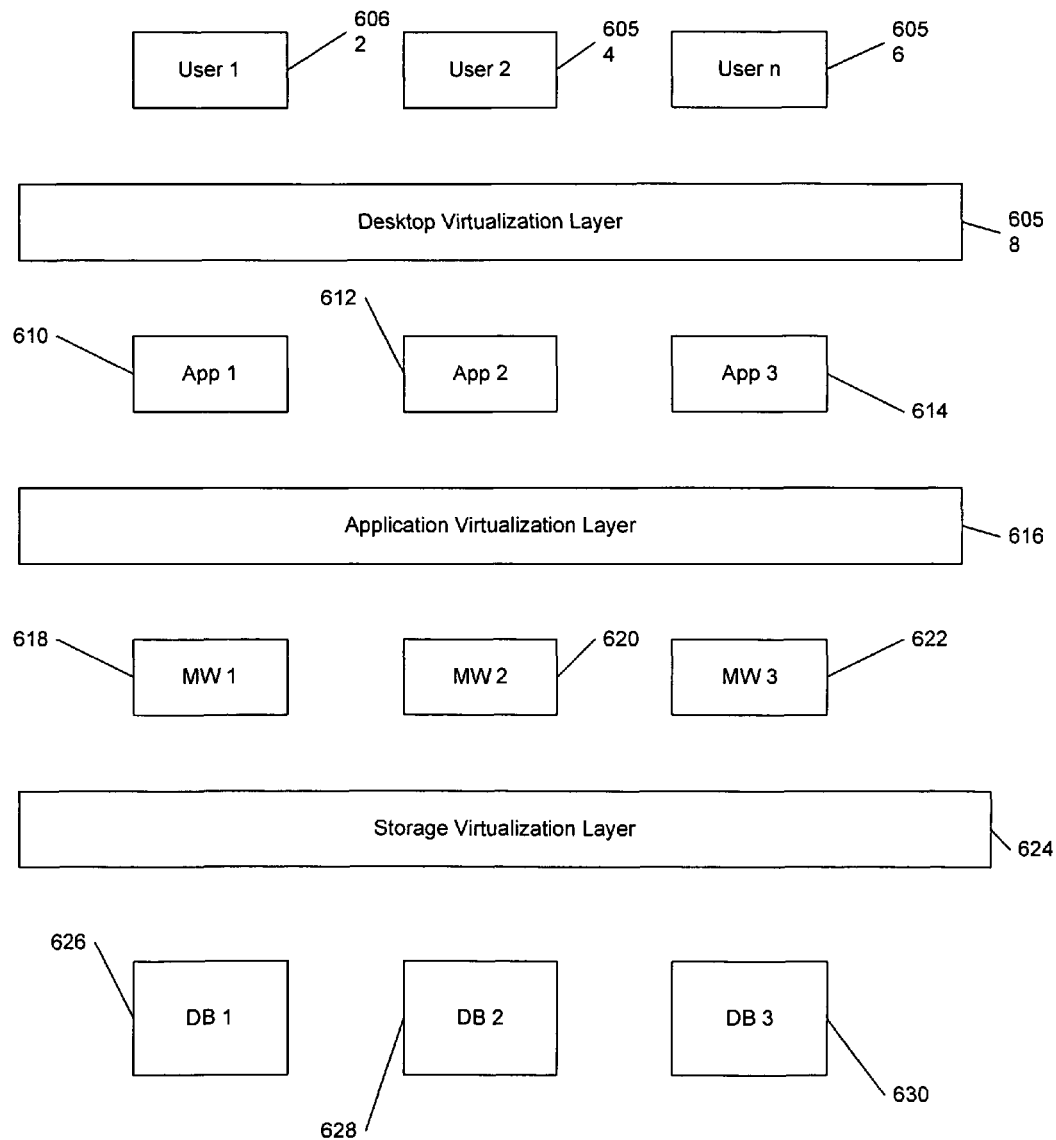
FIG. 6 is a representation of the virtualization configuration with which the present invention can be deployed.

FIG. 6 is a representation of the virtualization environment that can be managed using a computer with the Control Center application described herein, such as the Control Center A 110 and the Control Center B 112 illustrated in FIG. 1. FIG. 6 is a schematic diagram that illustrates the various levels of virtualization that can be reached and managed with the Control Centers. In FIG. 6, multiple end users 602, 604, 606 can access physical resources and virtual assets of the host computer 300. FIG. 6 shows a conceptualized depiction of the access as the multiple users being accommodated through multiple virtual desktops, or user interfaces, through a desktop virtualization layer 608. The desktop virtualization layer presents the users with a collection of virtual assets available to the users as they communicate over the network (see the system configuration illustrated in FIG. 1). The assets can include multiple applications of the host machine, depicted as "App 1" 610, "App 2" 612, and "App 3" 614 for purposes of illustration. The applications may include word processing, email, Web browsers, servers, and the like. The applications can be supported by middleware software through an application virtualization layer 616. The middleware applications are represented by "MW 1" 618, "MW 2" 620, "MW 3" 622. The middleware applications 618, 620, 622 can access data stores through a storage virtualization layer 624. The data stores are represented in FIG. 6 by databases 626, 628, 630 indicated as DB 1, DB 2, and DB 3, respectively. In accordance with the invention, the Control Center application can perform configuration management and forecasting services for the host computer and the available virtual assets through each of the various virtualization layers 608, 616, 624.

Figure 7:
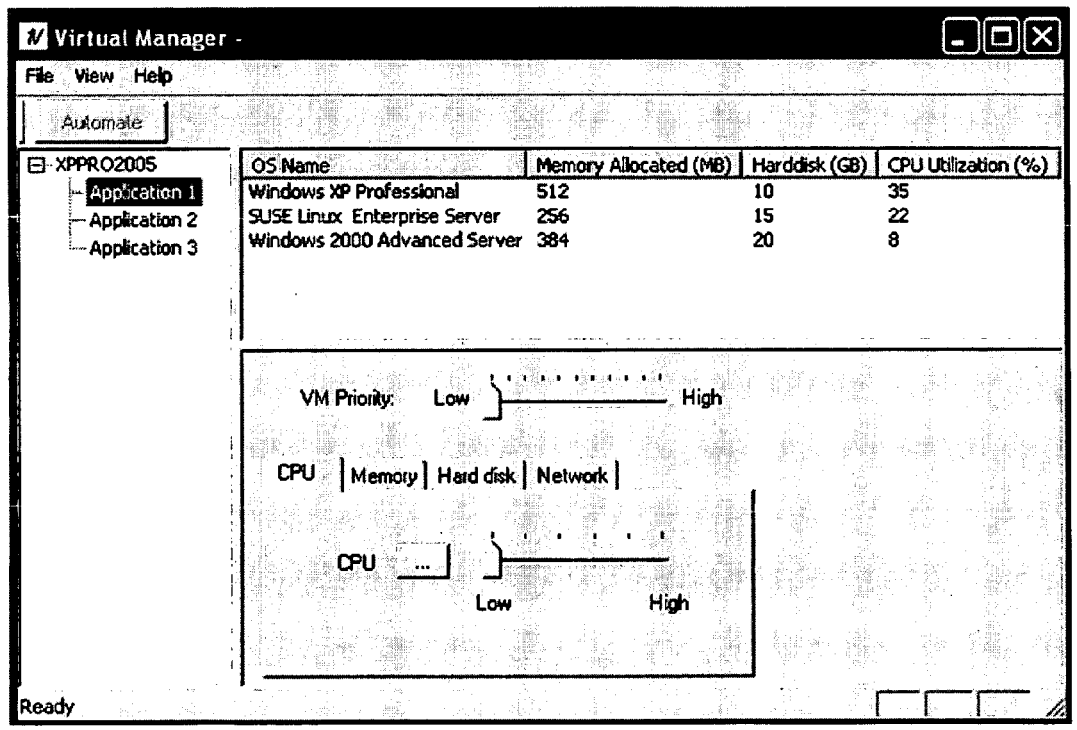
FIG. 7 is a screen shot of a display produced by the user interface of the Control Center computers of FIG. 1.

FIG. 7 is a screen shot of a Control Center display produced by the user interface of the Control Center computers 110, 112 of FIG. 1. That is, the Control Center virtualization management application provides a user interface that includes a display such as illustrated in FIG. 7. The "Virtual Manager" program window shows a list of applications in a left window pane corresponding to a virtual environment for the specified host machine, which is illustrated as "XPRO2005" in the left window pane. The Control Center display shows that the XPRO2005 computer includes three applications, which are operating systems, as shown in the detail pane on the right side of the display. The three operating systems are illustrated in FIG. 7 as "Windows XP Professional", "SuSE Linux Enterprise Server", and "Windows 2000 Advanced Server". Other operating systems can be supported by the Control Center.

The setting pane on the right side, below the OS listing pane, shows the user interface feature for setting operating parameters of the Control Center. The priority of the virtual machine under management (VM Priority) can be set with a display slider from low priority to high priority. A high priority setting means that the VM will have a high probability of being instantiated on the host machine under management. A low priority setting means that the VM is a likely candidate for deletion from the virtualization of the host machine if resource utilization is great and if other VMs have a higher priority setting. The virtualization parameters that can be set for the virtualization environment through the user interface of FIG. 7 include settings for operation of CPU, memory, hard disk, and network.

The installed Control Center application provides a network-based, intelligent orchestration engine for automatic management of virtual assets across multiple computer virtualization platforms around a network. The exact management functions that can be performed by the Control Center will depend on the number of components selected for installation on the Control Center computer. The full complement of components are illustrated in FIG. 2 and were described above. The illustrated embodiment described herein is constructed with a modular approach, so that users can select desired components and can leave out the rest. The following description of operating feature details assumes a full installation of all the FIG. 2 Control Center components, except where noted, and the full installation will be referred to as the "application" except where a particular component is singled out for description or mention. It should be understood that installing any one of the FIG. 2 components will provide a user interface that includes the Control Center, albeit with functionality in accordance with the installed components.

The Control Center application provides a centralized repository for virtual infrastructure configuration change management with an audit trail for IT compliance requirements. In accordance with the application, macro-level policies are defined based on business needs. These are implemented as Application Criticality Rules (ACRs), described further below. The Control Center operates as a virtual controller that can mediate between physical server, network, applications; and storage resources. Such mediation can occur based on a combination of portable, application-provided as well as user-defined, Knowledge Blocks (KBs). The Control Center can also provide Adaptive Application Routing (AAR) for virtual assets based on the ACRs. With the Knowledge Blocks, the Control Center can take intelligent actions based on the KBs when any of the ACRs are violated.

The ACRs allow a user to specify business rules for controlling priority settings for applications. For example, in a system with a set of five application App1, App2, App3, App4, and App5, one of the rules could specify that, each morning from 6:00 am to 10:00 am, the five applications will have priorities set as follows: App1 has high priority, App2 has low priority, App3 has medium priority, App4 has low priority, and App5 has high priority. If preferred, the Control Center can provide a priority setting that is numerical, such as a range of integral numbers between 0 (zero) and 10 (ten). Other priority range indicators can be used as desired, such as colors or other indexes. If traffic to an application is detected as being above a threshold level, another business rule could specify a dynamic response, that the priority for the corresponding application can be adjusted higher. Conversely, action could be specified to reduce priority if traffic is detected as abnormally low. Another business rule could be set for prospective action, for example, such that a particular application is given an increased priority according to time of day.

Control Center management of virtual assets and mediation between physical resources in conjunction with the ACRs provides a robust load balancing functionality with the ability to distribute server load among potential host machines, and determine when and how to increase or decrease the number of VM's to improve overall system throughput.

For purposes of the load balancing function, load can be calculated on a server by following several alternative criteria, or parameters. One parameter can be CPU run queue length, which returns the load as the average number of processes in the operating system (OS) run queue over a specific time period in seconds, normalized over the number of processors. Another parameter is CPU utilization, which returns the load as the CPU usage percentage. Other suitable parameters can include Network Performance (traffic throughput), Disk Performance, which can be measured by the number of bytes read and/or written in a specific time period in seconds, and Memory Performance, mainly by the ratio of the active memory used as compared with total managed memory. If desired, a weighted formula can be used for computing the load on a particular host based on these parameters.

With such parameters available, the load balancing strategy can be implemented with two different strategies: Static load balancing and dynamic load balancing. Static load balancing is similar to having a pre-defined set of minimum and maximum number of VM's that can run on a given host. The Dynamic load balancing approach suggests that, based on the current and the future load on a host, a decision is made as to which VM should run on which host. Once a set of hosts are identified, then the load balancer processing can pick a particular host, by a round-robin or a weighted round-robin method. The load balancer processing would first try to assign the high priority VM's to hosts with minimum load.

The Control Center also provides an interface to the installed configuration management application, which operates in conjunction with observed real-time events on the network. This is achieved through a four-step process that includes (1) monitor, discover and alert tasks, (2) applying user-guided fix automation tasks, (3) automatically applying basic KBs, and automatically applying more complex KBs and user-defined KBs. In addition, the Control Center provides a mechanism to centrally schedule resource re-allocation in response to defined business events.

Figure 8:
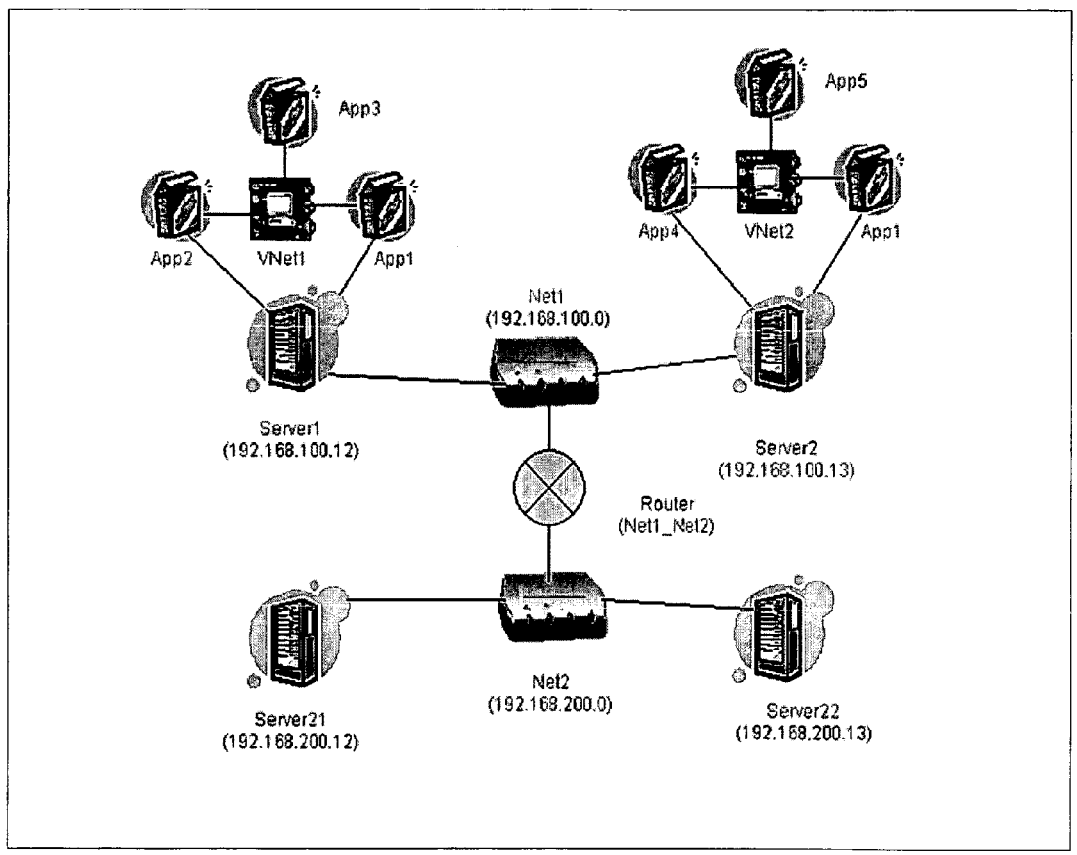
FIG. 8 is a screen shot of the Physical View display page of the user interface, accessed from the Control Center computers of FIG. 1.

FIG. 8 and the following drawing FIG. s illustrate the automatic virtualization management in accordance with an embodiment of the invention in the context of managing a collection of virtual assets comprising application servers, but it should be understood that the Control Center virtualization management application being described can also be used to manage other virtual assets, such as user desktops (user interfaces), data storage such as database arrays and attached storage, and network traffic devices such as routers and switches.

FIG. 8 is a screen shot of the Physical View display page of the user interface, accessed from the Control Center computers 110, 112 of FIG. 1. FIG. 8 shows that the Physical View display enables a user to visualize resource utilization relationships. For example, FIG. 8 graphically illustrates two subnets attached to the Control Center computer, indicated as Net 1 and Net 2. This illustrated arrangement is analogous to Control Center B of FIG. 1, which shows Rack B1 and Rack B2 under management of Control Center B. Thus, Rack B1 could correspond to Net 1 and Rack B2 could correspond to Net 2. Alternatively, Net 1 and Net 2 could correspond to other types of network subdivisions. For example, Net 1 and Net 2 could relate to geographical divisions of the network, or could correspond to departmental groupings or subnet groupings.

In FIG. 8, Net 1 is shown as a virtual environment that includes Server 1 and Server 2, each of which manages a VNet 1 and a VNet 2, respectively. Operating on VNet 1 are an instance of App 1, an instance of App 2, and an instance of App 3. Under Server 2, the operating applications include one instance of App 1, an instance of App 4, and an instance of App 5. Thus, VNet 1 and VNet 2 are virtual networks that are deployed within Server 1 and Server 2. This view shows the application topology within the virtual infrastructure, and shows which virtual asset is running on what physical resource (dependency) and how they are interconnected via virtual networks and physical networks.

Knowledge Block

The Knowledge Block feature can be used to specify analysis rules that can detect application performance degradation. In response to such detection, an alert can be sent over the network, such as an alert message being sent to a network administrator. After an alert message has been sent, the configuration management application can wait for an administrative action, or the application can be set up so as to execute an automatic action. For example, in response to a "crash" of a virtual machine, the application can find the last known "good" VM image from a repository and can deploy that image to the affected machine. In response to overtaxed applications, the application can deploy a new application instance, and can add new application instance information into a network load balancer to indicate the new instance is available and should be considered as part of the "available application pool". In addition, the application can remove a degrading application from the available application pool, or can move a degrading application VM from a group of production servers to a debug server pool. Other functions that can be performed by the application in accordance with Knowledge Blocks include the capture of log files from the degrading application VM, the capture of archive logs and sending of email alert messages to an administrator with the archive log location, and the halting of a degrading application VM and removal of it from the debug server pool.

Figure 9:
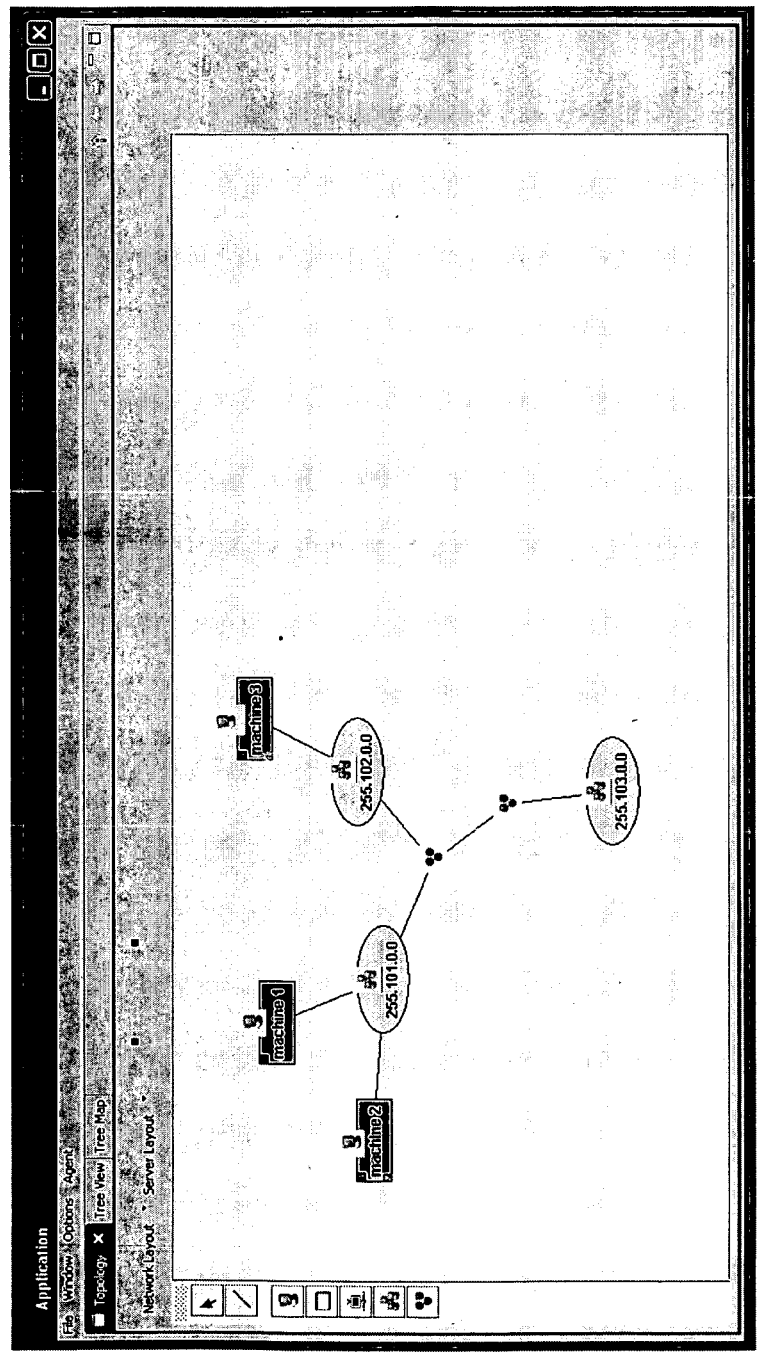
FIG. 9 is a screen shot illustration of a Control Center display that shows a topology view of the virtual environment under management.

FIG. 9 is an illustration of a Control Center display that shows a topology view of the virtual environment under management. FIG. 9 shows physical resources and virtual assets such as depicted in FIG. 8, but illustrates particular user interface features of the Control Center software. Thus, FIG. 9 shows three physical servers, representing networks, indicated by network addresses 255.101.0.0, 255.102.0.0, and 255.103.0.0. Machine 1 and Machine 2, which are physical resources, are shown connected to the 255.101.0.0 server, and Machine 3, another physical resource device, is shown connected to the 255.102.0.0 server. Various network management operations can be carried out with a drag-and-drop user interface, represented by the icons arrayed along the left side of the display window. For the objects in the large window pane, these operations represent moving display objects, connecting objects, and creating instances of objects such as networks, storage, routers, hubs, and the like.

Figure 10:
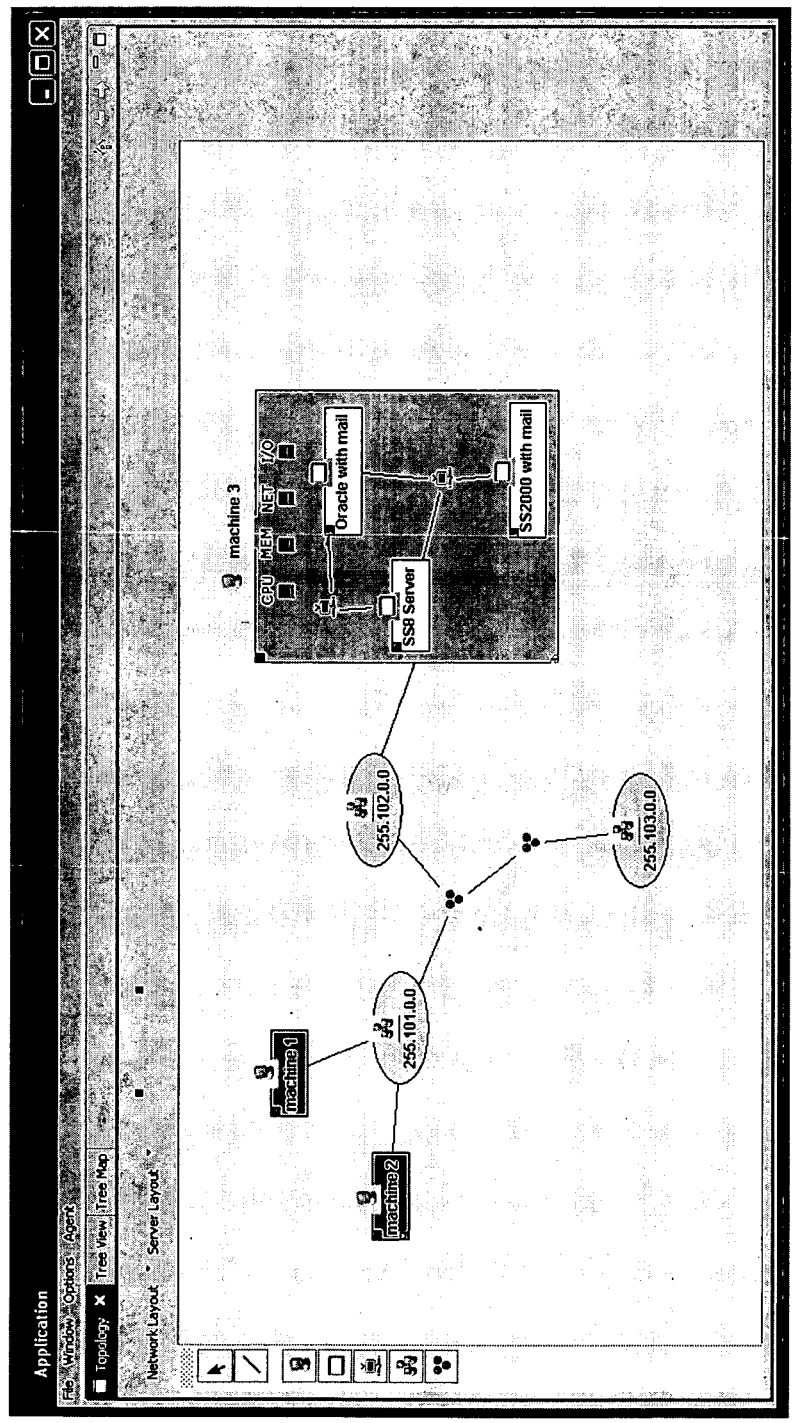
FIG. 10 is an expanded view screen shot of the topology view shown in FIG. 9.

FIG. 10 is an illustration of the FIG. 9 topology view showing Machine 3 expanded. The expanded (Level 1) view shows that Machine 3 is installed with virtual server applications that include "SSB Server", "Oracle with mail", and "SS2000 with mail". These virtual assets are connected so as to comprise a virtual network connected to the 255.101.0.0 server. The menu choices CPU, MEM, NET, and I/O in the Level 1 window for Machine 3 indicate that additional configuration details for these respective characteristics of Machine 3 are available in a Level 2 display (not illustrated) by selection of the corresponding display icons.

Figure 11:
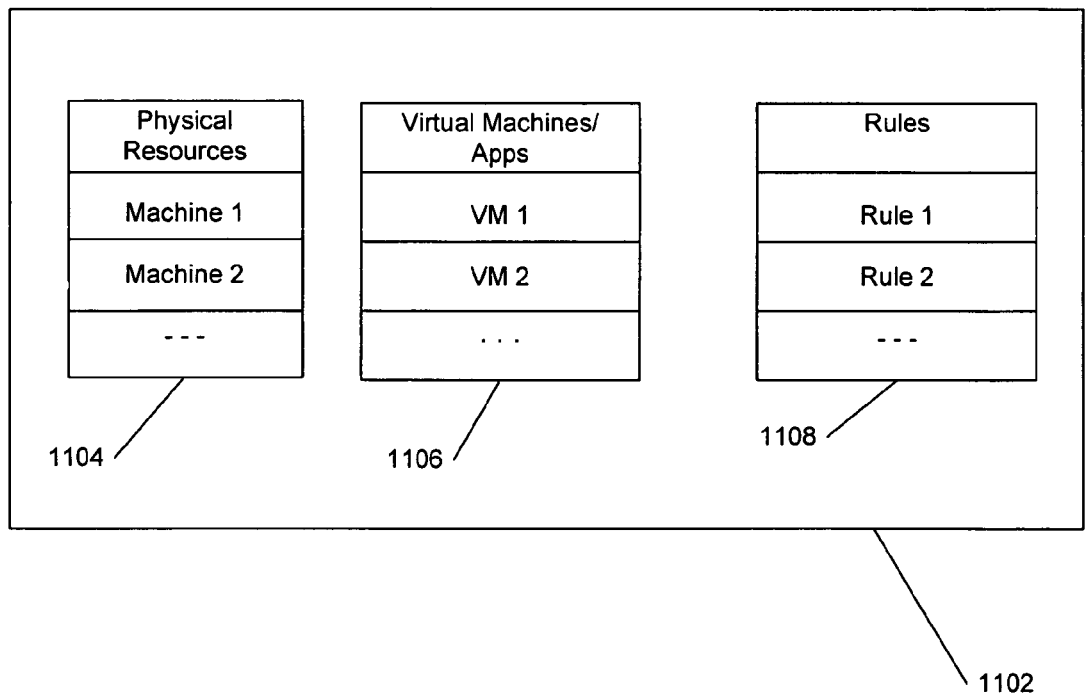
FIG. 11 is a block diagram representation of a server virtualization configuration management that can be implemented from a computer such as illustrated in FIG. 1.

FIG. 11 is a block diagram representation of a server virtualization configuration management scheme that can be implemented from a computer such as the Control Center computers 110, 112 illustrated in FIG. 1. FIG. 11 depicts the virtualization management 1102 of the network computer system 100 (FIG. 1) as comprising an association or mapping between the actual Physical Resources, such as a collection of computer hardware machines 1104, to a collection of Virtual Machine Assets 1106, or applications, in accordance with a set of application critical Rules 1108. In a typical system, for example, two physical machines might be sufficient to deploy forty virtual machines, each of which can be assigned a different application to operate and thereby provide services to network users. The configuration of the Virtual Machines 1106 and their corresponding operational applications will be governed by the set of Rules 1108. Thus, if a rule specifies that a particular application has a high priority at a particular time of day, then a respective one of the Control Center computers 110, 112 (FIG. 1) will adjust the deployment of applications among the Virtual Machines 1106 under its management at the appropriate times.

The server virtualization implementation described thus far can be used to control and manage a complete virtualization environment, including assets such as storage assets, virtual routers, and virtual desktops. Such configurations are depicted in FIG. 12, FIG. 13, and FIG. 14.

Figure 12:
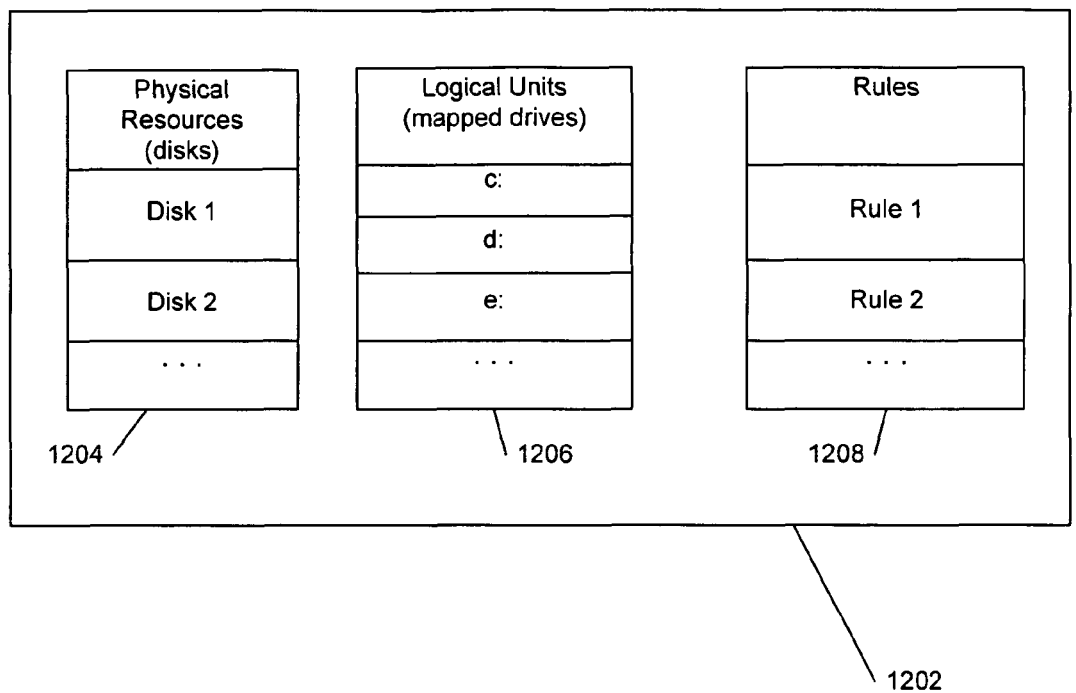
FIG. 12 is a block diagram representation of a storage virtualization configuration management that can be implemented from a computer such as illustrated in FIG. 1.

FIG. 12 is a block diagram representation of how storage in physical servers can be allocated by the virtual server using the system management of the present invention. FIG. 12 depicts the configuration management 1202 of the network computer system 100 (FIG. 1) as comprising an association or mapping between actual Physical Resources comprising a collection of disk drives or storage devices 1204 to a collection of Logical Units 1206, such as network virtual storage drives, in accordance with a set of application critical Rules 1208. That is, the storage servers (physical resources comprising disks) are mapped to virtual assets (logical units). In a typical system, for example, two physical machines (CPUs with attached data devices) might be sufficient to implement forty logical units, each of which can be assigned a different network drive assignment, such as drive c:, or d:, or e:, and so forth, to operate and thereby provide data storage for network users. The configuration of the Logical Units 1206 and their corresponding virtual drives will be governed by the set of Rules 1208. Thus, if a rule specifies that a particular network drive should have a capacity of 50 GB while a particular application is running, to act as temporary storage for the application, then the configuration management application 110, 112 will adjust the data capacity configuration of the logical unit 1206 to provide the desired capacity, and will load the desired data, for the appropriate operational conditions.

Figure 13:
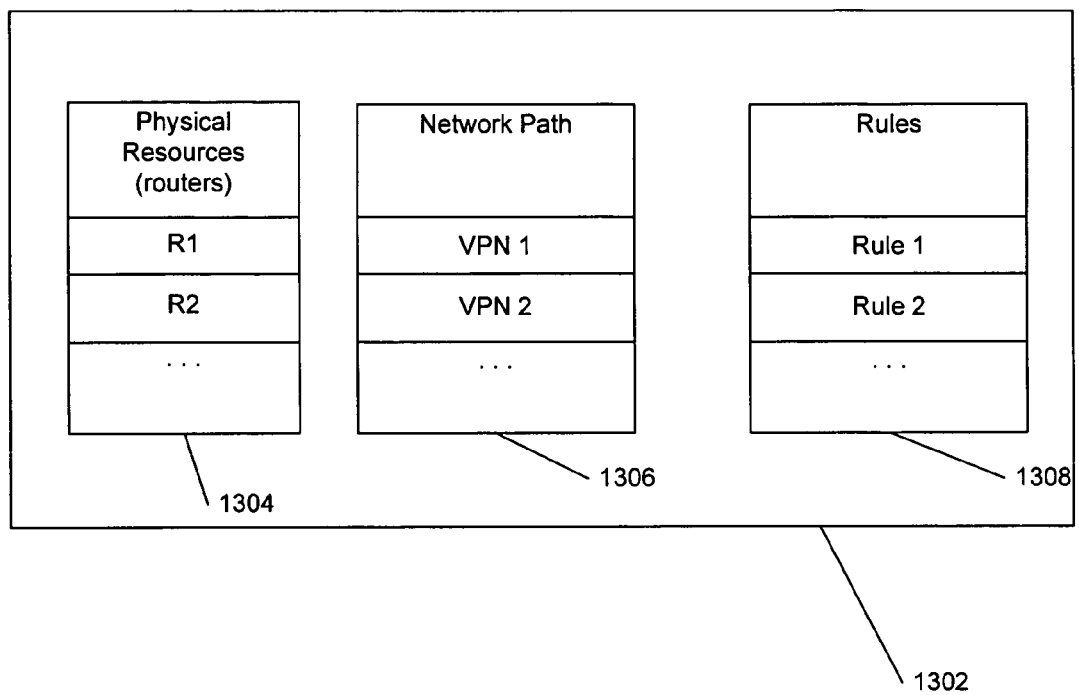
FIG. 13 is a block diagram representation of a network router virtualization configuration management that can be implemented from a computer such as illustrated in FIG. 1.

FIG. 13 is a block diagram representation a network router virtualization configuration that can be managed through a virtual server that is managed from a Control Center computer 110, 112 such as illustrated in FIG. 1. FIG. 13 depicts the configuration management 1302 of the network computer system 100 (FIG. 1) for a collection of actual Physical Resources comprising a collection of processing devices for network path control, such as programmable machines or computers otherwise configurable through a virtualization layer to provide control of network paths, such as devices that can operate as routers 1304. The devices 1304 are associated with or mapped to assigned network paths 1306, such as virtual private network (VPN) devices, or secure routers. The mapping is in accordance with a set of application critical Rules 1308. In a typical system, for example, two physical machines (CPUs with attached network communications abilities) might be sufficient to implement a set of forty VPN servers, each of which can be assigned to different network paths or addresses. The configuration of the Network Path devices 1306 and their corresponding routing operations will be governed by the set of Rules 1308. Thus, if a rule specifies that a particular VPN router 1306 should handle traffic for a particular address, then the Control Center virtualization management application will adjust the network path assignment of the VPN router 1306 to provide the desired assignment.

Figure 14:
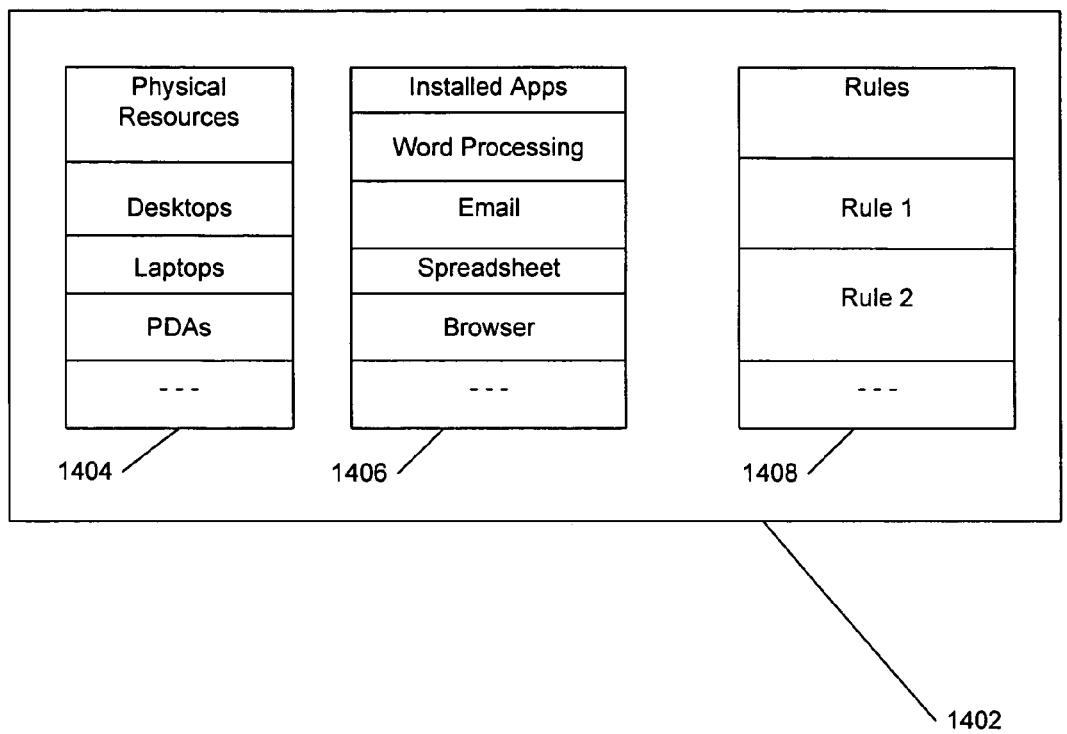
FIG. 14 is a block diagram representation of a desktop computer virtualization configuration management that can be implemented from a computer such as illustrated in FIG. 1.

FIG. 14 is a block diagram representation of a desktop computer virtualization configuration that can be managed through a virtual server that is managed from a Control Center such as illustrated in FIG. 1. FIG. 14 depicts the configuration management scheme 1402 of the network computer system 100 (FIG. 1) as comprising an association or mapping between actual Physical Resources comprising a collection of computers or other processing devices 1404 to a collection of Installed virtual asset Applications 1406, such as virtual machine applications including word processing, email, spreadsheet, and Web browser, in accordance with a set of application critical Rules 1408. In a typical system, for example, a collection of physical computing machines 1404 (processing devices such as desktops, laptops, and PDAs) might be sufficient to implement forty virtual user interfaces, each of which can provide a collection of installed applications 1406. The configuration of the Installed Applications 1406 will be governed by the set of Rules 1408. Thus, if a rule specifies that a particular user interface should include word processing and a Web browser during specified times of day, but then delete the browser application at other times of day, then the Control Center virtualization management application will adjust the deployed applications of the logical unit 1406 to provide the desired user interface, for the appropriate operational (time-of-day) conditions.

Although FIG. 11 describes the virtualization management of virtual assets in the context of virtual machines or servers, as noted above, the Control Center application 202 (FIG. 2) described herein also can be used for management of other network virtual assets, such as virtual storage devices, network path devices, and user interfaces (desktops).

Figure 15:
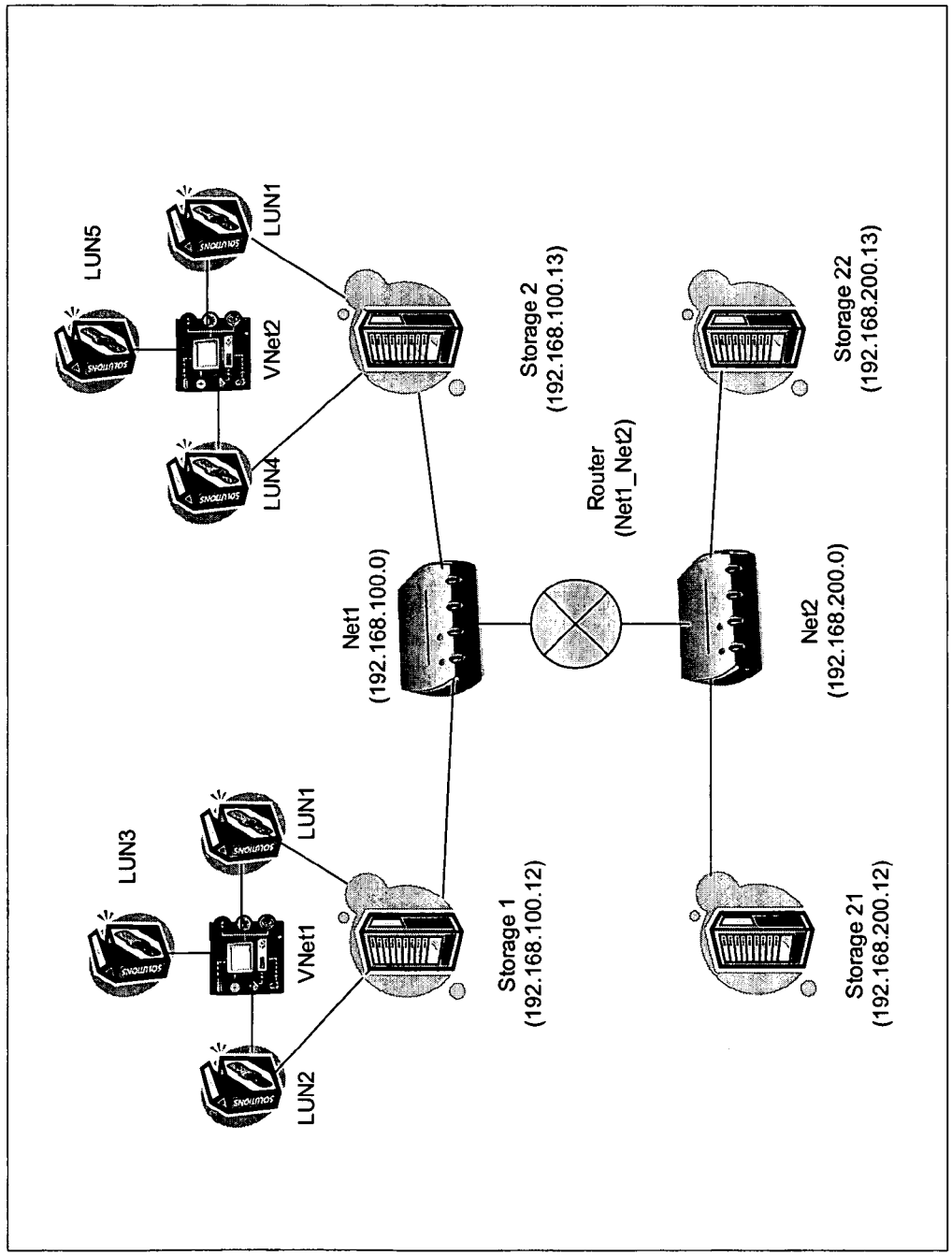
FIG. 15 is a screen shot of the Physical View display page of the user interface for a storage virtualization, accessed from the Control Center computers of FIG. 1.

FIG. 15 is an illustration of a storage virtualization configuration that can be managed in accordance with the present invention. Those skilled in the art will recognize that FIG. 15 is similar to the illustration of FIG. 8 except for depicting storage devices and virtual storage assets (logical units, or LUNs) in place of servers and virtual applications, respectively. Thus, corresponding details of the discussion above for the server virtualization may be applied to the storage virtualization depicted in FIG. 15, which those skilled in the art will understand in view of this description. Similarly, the present invention can be used in conjunction with other corresponding virtualizations, such as routers and desktops.

Figure 16:
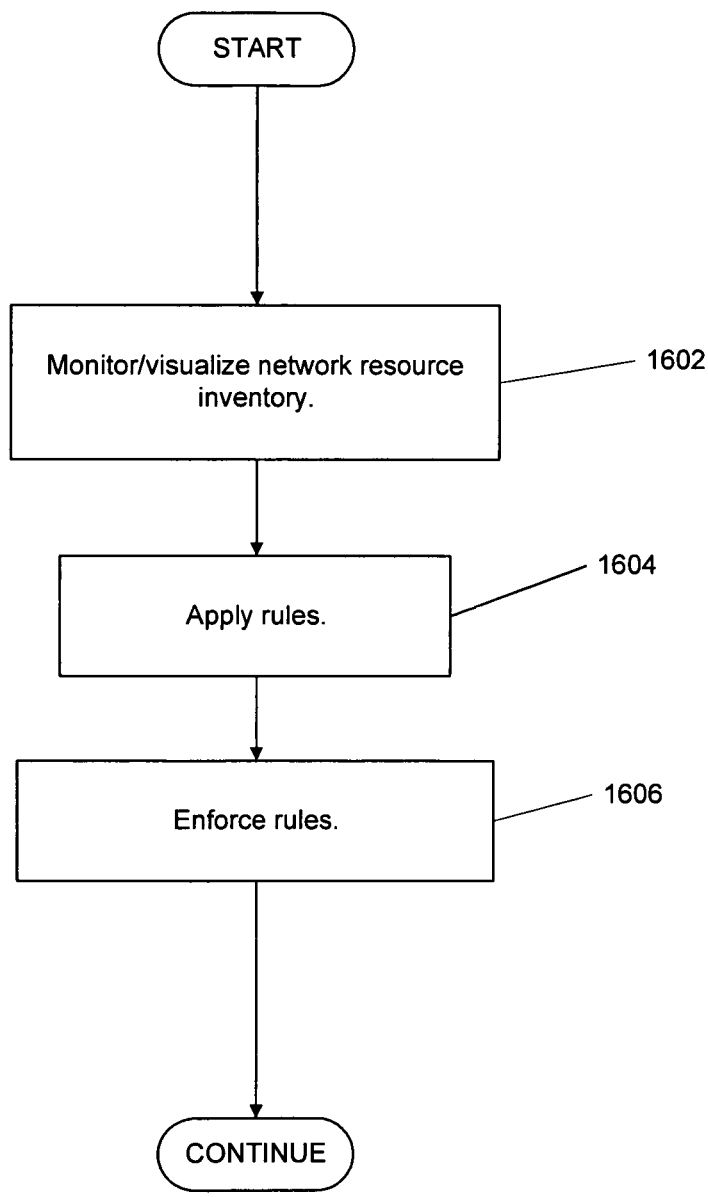
FIG. 16 is a flow diagram that illustrates operation of the computer such as illustrated in FIG. 1.

FIG. 16 is a flow diagram that illustrates operation of the computer installed with the Control Center application 110, 112 such as illustrated in FIG. 1. When the application is launched, generally on boot up of the computer, the application will first perform a monitor and inventory operation 1602 that will determine the collection of virtual assets available to the computer. The monitor and inventory operation involves the Control Center application communicating with the virtualization platform software to determine a pool of available resource and asset inventory, including user interface inventory (such as installed applications), network servers, network storage devices, network routers and switches, and the like, all accessible from the host machine. As noted above, such communications are facilitated in appropriate situations by the presence of a Control Agent in each host machine. The Control Agent can provide the necessary communications facilities for communications between the host machine and the associated Control Center computer.

After the Control Center determines the collection of available virtualization assets, the next operation is for the application to apply the application rules 1604. These include the Application Critical Rules such as illustrated above in FIGS. 11-14 and any rules defined by the user in Knowledge Blocks or imported as Knowledge Blocks. The next operation is for the Control Center application to enforce the rules 1606. For example, the rules may specify the number of application servers of a particular type that are deployed at given times of the day, or in response to detected network traffic conditions. Other discretionary operations may then continue.

Figure 17:
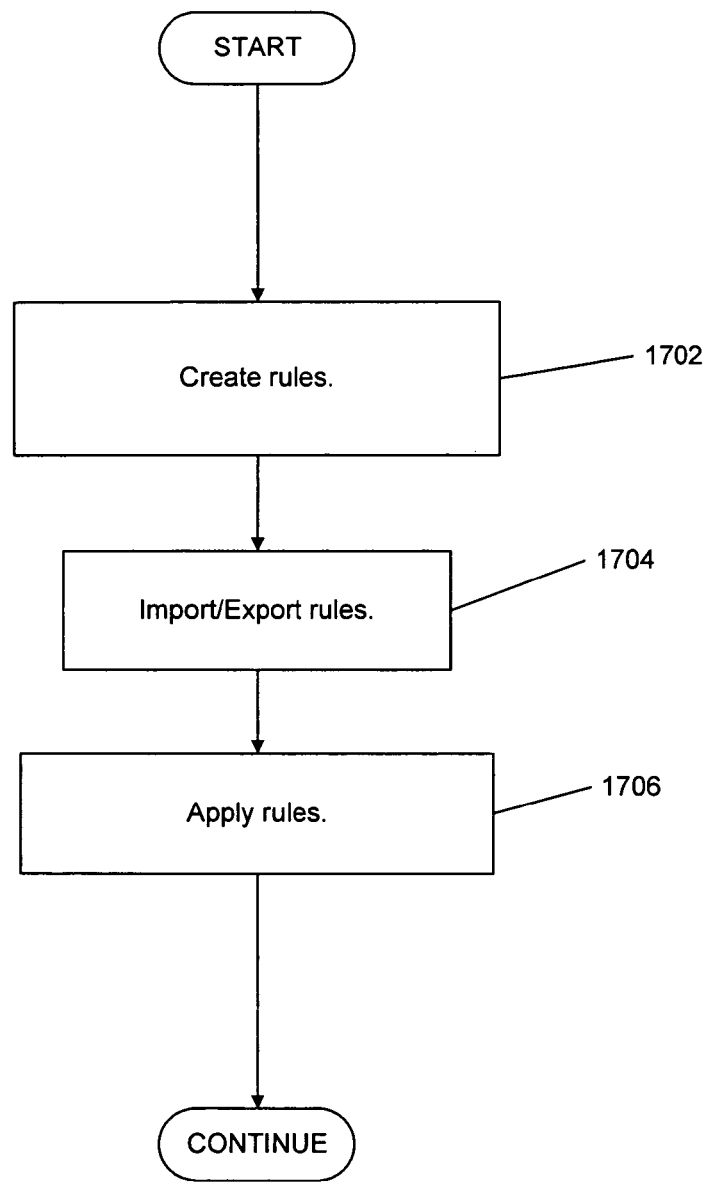
FIG. 17 is a flow diagram that illustrates operation of Knowledge Block processing so the computer such as illustrated in FIG. 1 can operate.

FIG. 17 is a flow diagram that illustrates operation of Knowledge Block processing for the Control Center computer such as illustrated in FIG. 1. In the first operation, the group of rules can be created 1702. These rules can include rules that are default rules common to all implementations of the application, and can also include rules that the user has fashioned for particular purposes using the rule editor. In the next operation, Knowledge Block rules can optionally be imported or exported 1704. In the last Knowledge Block processing operation, the rules are applied 1706. As noted above, application of the rules can result in automatic configuration changes that the Control Center application implements through an interface with the virtualization layer software. Other processing can then take place.

Figure 18:
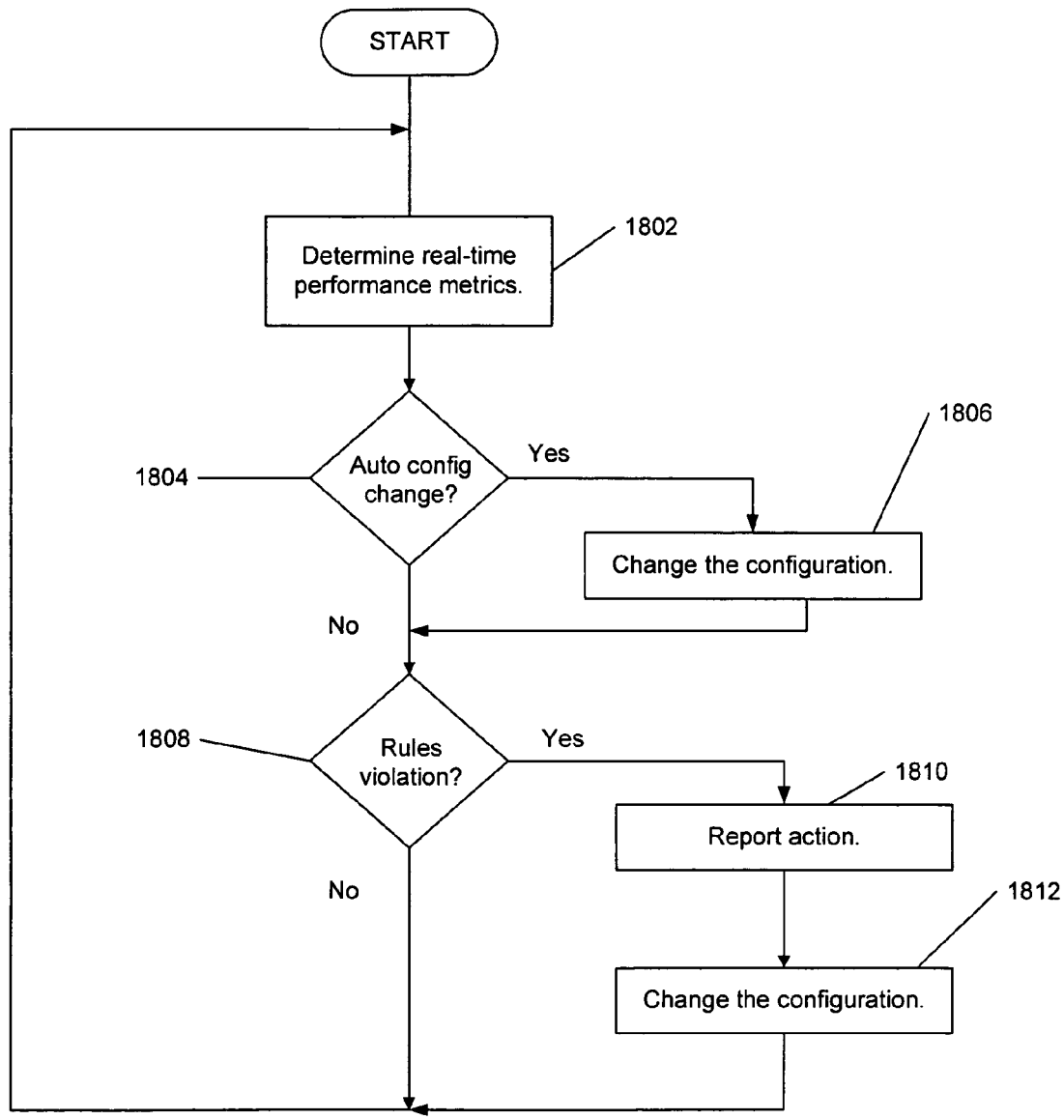
FIG. 18 is a flow diagram that illustrates operation of the Control Center interface for the computers illustrated in FIG. 1.

FIG. 18 is a flow diagram that illustrates operation of the Control Center computers 110, 112 illustrated in FIG. 1. In the first operation, real-time performance metrics are obtained 1802. Such metrics include utilization rate for each of the virtual assets, such as virtual network servers, virtual routers, virtual storage, and the like. Such metrics are also used in the load balancing function, as described above. Next, the Control Center application checks for any automatic configuration changes that are called for 1804. For example, one of the rules might specify a specific mix of virtual servers at a given time of day. Depending on the time of day, then, the application might instantiate more or fewer virtual servers, as specified by the rule (KB).

If configuration changes are called for, an affirmative outcome at the decision box 1804, then the Control Center issues commands to the virtualization layer software to implement the desired configuration changes 1806. Those skilled in the art will understand how to implement such configuration changes without further explanation, given the description herein. If no configuration changes are called for, a negative outcome at the decision box 1804, then the Control Center next checks to determine if any of the ACRs or Knowledge Block rules have been violated by any system configuration settings or performance metrics, as indicated by the decision box 1808. If there has been a rules violation, an affirmative outcome at the decision box, then the application reports the violation 1810. The report can take the form of an alert email message generated by the Control Center application that is sent to a network administrator or other predetermined email mailing address. After the alert email message has been sent 1810, the Control Center issues commands to the virtualization layer software to implement the desired configuration changes 1812. Those skilled in the art will understand how to implement such configuration changes without further explanation, given the description herein. Operation then returns to determining real-time system performance metrics 1802 and the loop repeats for as long as the Control Center application is executing. If there was no rules violation, a negative outcome at the decision box 1808, then no configuration change is carried out and, instead, operation returns to determining the performance metrics and the loop repeats itself.

In this way, the Control Center provides automatic virtualization management for computer network systems that include network virtual assets. A wide range of installation enhancements can be implemented, including business (application critical) rules, import and export of rules, and administrator alert messages.

The present invention has been described above in terms of presently preferred embodiments so that an understanding of the present invention can be conveyed. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method for automatic management of a virtualization environment in a computer network, the method comprising:
providing a virtualization environment that has a virtualization layer, network resources and virtual assets, the virtual assets including at least one software instantiations of equipment objects in the virtualization environment, the virtualization layer managing the virtual assets;
providing a controller coupled to the virtualization environment over a network that communicates with the virtualization layer;
determining, using the controller that communicates with the virtualization layer, an inventory of network resources and virtual assets available to the virtualization environment;
provisioning, by the controller that communicates with the virtualization layer, the virtual assets from among the available inventory, thereby establishing a provisioned virtualization environment;
determining, at the controller, real time performance metrics for the provisioned virtualization environment;
receiving a Knowledge Block that specifies parameters that send an alert message to an administrator of the network in response to an alert condition and determines one or more reallocation parameters to be considered with the real time performance metrics in producing the reallocation of assets and wherein the Knowledge Block specifies parameters that detect operational degradation of a member of the available inventory which is halted and removed from the available inventory;
automatically determining at the controller for the provisioned virtualization environment under control of the controller, a reallocation of the virtual assets in response to the reallocation parameters and real time performance metrics;
initiating, by the controller that communicates with the virtualization layer, the reallocation of the virtual assets in the provisioned virtualization environment.

2. The method of claim 1, wherein the available inventory member that is detected as degraded is removed from the available inventory.

3. The method of claim 1, wherein the available inventory that is detected as degraded is moved from the available inventory to a debug inventory pool.

4. The method of claim 1, wherein log files are retrieved from the available inventory that is detected as degraded.

5. The method of claim 4, wherein the log files are stored in an archive and an alert message is sent to a network administrator with an identification of the log file archive location.

6. The method of claim 1, wherein the Knowledge Block specifies parameters that deploy an instance of an application selected from among the available inventory.

7. The method of claim 1, wherein the received user input specifies a priority for one or more of the available inventory.

8. The method of claim 1, wherein the user input specifies a time period during which the reallocation will be applied.

9. The method of claim 1, further comprising: providing a user interface through which user input can be received and wherein the user input adjusts scheduling of producing the reallocation.

10. The method of claim 1, wherein producing a reallocation comprises adding a new application instance to the available inventory.

11. The method of claim 1, wherein producing a reallocation comprises updating the available inventory to include any changes made by the reallocation.

12. The method of claim 1, wherein the inventory of available inventory includes one or more application programs.

13. The method of claim 12, wherein one of the application programs comprises a network load balancer.

14. The method of claim 12, wherein one of the application programs comprises a network server.

15. The method of claim 1, wherein: determining, by an Asset Manager Component, an inventory of available network resources and virtual assets; assigning prioritization to the available inventory and provisioning virtual assets from among the available inventory, performed by a Provisioning Manager component; determining, by a Performance Manager component, a real time performance metrics; and automatically producing and initializing, by an Optimizer component, a reallocation of the virtual assets.

16. The method of claim 15, wherein automatically producing a reallocation of the virtual assets comprises forecasting future system needs, which is performed by a Capacity Planning Manager component.

17. The method of claim 1 wherein the virtual assets further comprise a second virtual machine which comprises virtual assets, and the at least one virtual machine and the second virtual machine each run their own respective operating systems which are a different type of operating system from each other.

18. The method of claim 1 wherein provisioning virtual assets from among the available inventory further comprises routing an application running on a first virtual machine to run on a second virtual machine.

19. The method of claim 1 wherein provisioning virtual assets from among the available inventory further comprises communicating provisioning instructions from a control agent comprising at least one virtualization platform adapter to a virtualization layer in the single physical host.

20. A method for automatic management of a virtualization environment in a computer network, the method comprising:
providing a virtualization environment that has a virtualization layer, network resources and virtual assets, the virtual assets including at least one software instantiations of equipment objects in the virtualization environment, the virtualization layer managing the virtual assets;
providing a controller coupled to the virtualization environment over a network;
performing one or more functions by the controller that communicates with the virtualization layer from the group of functions consisting of
(1) identification and management of network resources and virtual assets,
(2) provisioning of virtual assets in response to network workflow demands,
(3) receiving a Knowledge Block that specifies parameters that send an alert message to an administrator of the network in response to an alert condition and determines one or more reallocation parameters to be considered with a performance measurement in producing the deployment of the assets and wherein the Knowledge Block specifies parameters that detect operational degradation of a member of the virtualization environment which is halted and removed,
(4) automatic dynamic deployment of virtual assets across the computer network based on the reallocation parameters, (5) performance measurement and reporting of resources and virtual assets, and (6) planning and forecasting of resource demands and virtual asset utilization of the virtualization environment;

wherein such functions are carried out without regard to processors, operating systems, virtualization platforms, and application software of the virtualization environment.

21. The method of claim 20 wherein provisioning virtual assets from among the available inventory further comprises creating a new virtual machine on the single physical host.

22. An apparatus that performs automatic management of a virtualization environment in a computer network comprising:

a virtualization environment that has a virtualization layer, network resources and virtual assets, the virtual assets including at least one software instantiations of equipment objects in the virtualization environment, the virtualization layer managing the virtual assets;

an operating system of the apparatus that supports the virtualization environment in communication with the apparatus over the computer network; and a Virtual Mapping layer that determines an inventory of network resources and virtual assets available to the virtualization environment, wherein the Virtual Mapping layer determines the inventory without regard to processors, operating systems, virtualization platforms, and application software of the virtualization environment; and a controller that communicates with the virtualization layer and provisions the virtual assets from among the available inventory, thereby establishing a provisioned virtualization environment, determines real time performance metrics for the provisioned virtualization environment, receives a Knowledge Block that specifies parameters that send an alert message to an administrator of the network in response to an alert condition and determines one or more reallocation parameters to be considered with the real time performance metrics in producing the reallocation of assets and wherein the Knowledge Block specifies parameters that detect operational degradation of a member of the available inventory which is halted and removed from the available inventory, automatically determines for the provisioned virtualization environment, a reallocation of the virtual assets in response to the reallocation parameters and the real time performance metrics and initiates the reallocation of the virtual assets in the provisioned virtualization environment.

23. The apparatus of claim 22, further comprising one or more components that receive the inventory of available resources and assets from the Virtual Mapping layer and perform one or more functions from the group of functions consisting of:

identification and management of network resources and virtual assets, dynamic deployment of virtual assets across the computer network, performance measurement and reporting of resources and virtual assets, and planning and forecasting of resource demands and asset utilization of the virtualization environment;

wherein such functions are carried out without regard to processors, operating systems, virtualization platforms, and application software of the virtualization environment.

24. The apparatus of claim 12, further comprising a component selected from a group consisting of: an Asset Manager component that determines an inventory of available network resources and virtual assets;

a Provisioning Manager component that assigns a prioritization to the available inventory and provisions virtual assets from among the available inventory;

a Performance Manager component that determines real time performance metrics; and an Optimizer component that automatically produces a reallocation of the virtual assets and initiates the reallocation.

\* \* \* \* \*

UNITED STATES PATENT AND TRADEMARK OFFICE
CERTIFICATE OF CORRECTION

PATENT NO.          : 8,799,431 B2
APPLICATION NO.     : 11/503090
DATED               : August 5, 2014
INVENTOR(S)         : Vipul Pabari Page 1 of 1

It is certified that error appears in the above-identified patent and that said Letters Patent is hereby corrected as shown below:

In the Claims,

Col. 26, lines 27-38, Claim 24 should read "24. The apparatus of claim 22 further comprising a component selected from a group consisting of: an Asset Manager component that determines an inventory of available network resources and virtual assets; a Provisioning Manager component that assigns a prioritization to the available inventory and provisions virtual assets from among the available inventory; a Performance Manager component that determines real time performance metrics; and an Optimizer component that automatically produces a reallocation of the virtual assets and initiates the reallocation".

Signed and Sealed this
Eighth Day of September, 2015

Michelle K. Lee
*Director of the United States Patent and Trademark Office*